(12) United States Patent
Gassoway et al.

(10) Patent No.: US 9,868,058 B2
(45) Date of Patent: Jan. 16, 2018

(54) THUMBSTICK WITH ADJUSTABLE TENSION

(71) Applicant: Microsoft Technology Licensing, LLC, Redmond, WA (US)

(72) Inventors: Gabriel Michael Rask Gassoway, Issaquah, WA (US); Joshua P. Weiher, Everett, WA (US); Eph John Evans, Kent, WA (US); Benjamin Michael Finney, Woodinville, WA (US); Jason Victor Tsai, Bellevue, WA (US); Jonathan Shea Robinson, Kirkland, WA (US); Aaron Schmitz, Redmond, WA (US); Dustin Tiffany, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 14/788,160

(22) Filed: Jun. 30, 2015

(65) Prior Publication Data

US 2017/0001106 A1 Jan. 5, 2017

(51) Int. Cl.
*G06F 3/033* (2013.01)
*G09G 5/08* (2006.01)
(Continued)

(52) U.S. Cl.
CPC .............. *A63F 13/24* (2014.09); *A63F 13/22* (2014.09); *G05G 9/047* (2013.01); *G06F 3/033* (2013.01); *G06F 3/0338* (2013.01)

(58) Field of Classification Search
None
See application file for complete search history.

(56) References Cited

U.S. PATENT DOCUMENTS 5,278,557 A  1/1994 Stokes et al.
7,338,374 B2  3/2008 Hammond et al.
(Continued)

FOREIGN PATENT DOCUMENTS

CA  2147575 A1  10/1996
CN  2843562 Y   12/2006
(Continued)

OTHER PUBLICATIONS

"International Search Report and Written Opinion Issued in PCT Application No. PCT/US2016/037461", dated Dec. 13, 2016, 19 pages.
(Continued)

*Primary Examiner* — Lana Spar
*Assistant Examiner* — Kirk Hermann
(74) *Attorney, Agent, or Firm* — Fiala & Weaver P.L.L.C

(57) ABSTRACT

Methods, systems, apparatuses, and computer program products are provided for a user input device, such as a game controller, that includes a thumbstick having adjustable tilt tension. The user input device includes a housing, a joystick assembly, a thumbstick cap, and an adjustment mechanism. The housing defines an internal cavity of the user input device and includes an aperture. The joystick assembly is disposed within the internal cavity. The joystick assembly comprises a tilt-able post and is operable to generate an analog input control signal based on a position of the tilt-able post in relation to a default position. The thumbstick cap is mounted through the aperture to an end of the tilt-able post. The adjustment mechanism is configured to enable a tilt tension of the tilt-able post to be changed.

21 Claims, 14 Drawing Sheets

(51) Int. Cl.
*A63F 13/24* (2014.01)
*G05G 9/047* (2006.01)
*A63F 13/22* (2014.01)
*G06F 3/0338* (2013.01)

(56) References Cited

U.S. PATENT DOCUMENTS

| | | | |
|---|---|---|---|
| 7,758,424 B2 | 7/2010 | Riggs et al. | |
| 7,993,203 B1 | 8/2011 | Walker et al. | |
| 8,496,528 B2 | 7/2013 | Muramatsu | |
| 2009/0295724 A1* | 12/2009 | Cheng | G05G 9/047 345/161 |
| 2010/0298053 A1 | 11/2010 | Kotkin | |
| 2011/0105231 A1* | 5/2011 | Ambinder | A63F 13/24 463/38 |
| 2011/0240454 A1* | 10/2011 | Ohshima | G05G 9/047 200/6 A |
| 2012/0172128 A1 | 7/2012 | Atzmon | |
| 2012/0274563 A1 | 11/2012 | Olsson | |

FOREIGN PATENT DOCUMENTS

| | | |
|---|---|---|
| CN | 203123534 U | 8/2013 |
| EP | 2113819 A2 | 11/2009 |
| GB | 2364367 A | 1/2002 |
| JP | 11353047 A | 12/1999 |
| WO | 2005049159 A2 | 6/2005 |
| WO | 2014009008 A1 | 1/2014 |

OTHER PUBLICATIONS

"Razer Onza Tournament Edition Wired Xbox360 Controller", Published on: Feb. 8, 2011, Available at: <http://www.pinoyxbox.com/forum/viewtopic.php?f=11&t=38391>, 2 pages.

Ashcraft, Brian., "Just How Good is the Razer Onza Tournament Edition? Quite Good", Published on: Apr. 20, 2011, Available at: <http://kotaku.com/5793875/just-how-good-is-the-razer-onza-tournament-edition-quite-good/>, 17 pages.

"Phoenix Revolution-Instruction Manual", Published on: Jul. 6, 2004, Available at: <http://service.mattel.com/instruction_sheets/I4160.pdf>, 1 page.

Revo, "Battle Beaver Custom's Controller Review", Published on: Jan. 8, 2015, Available at: <http://halofollower.com/battle-beaver-customs-controller-review/>, 4 pages.

"Xbox 360 Controller Razer Onza Tournament Edition", Published on: Nov. 28, 2011, Available at: <http://www.gamestop.com/xbox-360/accessories/xbox-360-controller-razer-onza-tournament-edition/97812>, 7 pages.

Pionneau, Fabien, "Mad Catz MLG Pro Circuit Controller", Published on: Oct. 10, 2012, Available at: <http://www.digitalversus.com/gamepad-controller/madcatz-mlg-pro-circuit-controller-p14514/test.html>, 7 pages.

"International Preliminary Report on Patentability Issued in PCT Application No. PCT/US2016/037461", dated May 16, 2017, 7 pages.

\* cited by examiner

THUMBSTICK WITH ADJUSTABLE TENSION

BACKGROUND

Various types of handheld device controllers exist, including handheld video game controllers. Game controllers are devices used with video game and/or entertainment systems to enable users to provide input, which may include controlling a character in a game, selecting audio and/or video content, and/or controlling other aspects related to the systems. A game controller may include one or more thumbsticks, which are stick-shaped user input interface features that are positioned and shaped to be manipulated by a thumb of a user, although a thumbstick can be manipulated by other fingers. A thumbstick is actuatable by the user to provide input for a variety of game functions. Examples of game controllers having thumbsticks include various types of Microsoft® Xbox® controllers developed by Microsoft Corporation of Redmond, Wash., United States, and the PlayStation® DualShock® 3 and 4 controllers, developed by Sony Computer Entertainment, Inc., of Tokyo, Japan.

Different users have different preferences in what they consider to be the "best" tension for a thumbstick on a game controller. A thumbstick with higher tension provides greater resistance to being tilted by a user's finger relative to a thumbstick with lesser tension.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for a user input device, such as a game controller, that includes a thumbstick having adjustable tilt tension. The user input device includes a housing, a joystick assembly, a thumbstick cap, and an adjustment mechanism. The housing defines an internal cavity of the user input device and includes an aperture. The joystick assembly is disposed within the internal cavity. The joystick assembly comprises a tilt-able post and is operable to generate an analog input control signal based on a position of the tilt-able post in relation to a default position. The thumbstick cap is mounted through the aperture to an end of the tilt-able post. The adjustment mechanism is implemented in one or more of the thumbstick cap or joystick assembly, and is configured to enable a tilt tension of the tilt-able post to be changed.

Further features and advantages of various embodiments of the disclosure, as well as the structure and operation of various embodiments of the disclosure, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figures 1A, 1B:
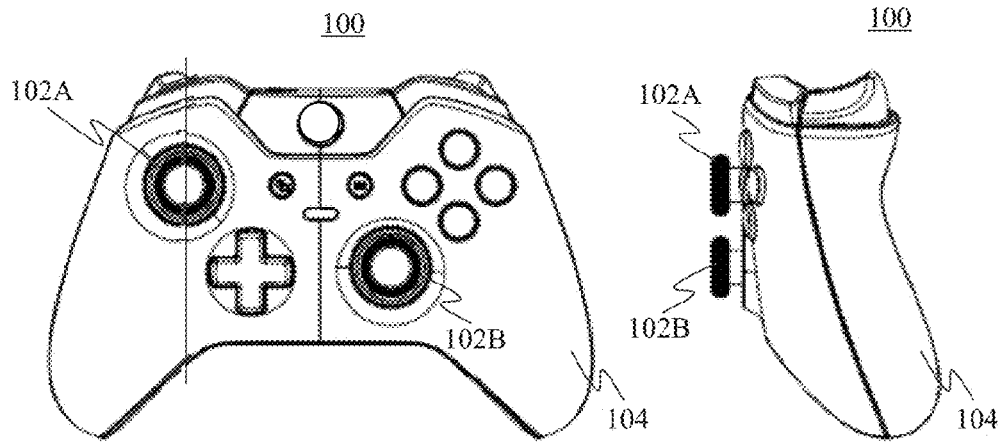
FIGS. 1A and 1B show front and side views, respectively, of an example user input device.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Furthermore, it should be understood that spatial descriptions ("above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for a Thumbstick with Adjustable Tension

User input devices exist that include various buttons and other user interface features, such as a thumbstick and/or other input mechanisms. Such user input devices enable users to interact with other devices. For instance, a television remote control enables a user to interact with a television. Another form of remote control device may be used to control an unmanned aircraft (e.g., a drone) or land-based vehicle. A game controller is a type of user input device that is designed to facilitate user interaction with a video game or other application executing on a computer, video game console, or other platform. For example, a game controller may provide a means by which a user can control a character or object within a video game. A variety of different types of game controllers exist and each game controller type may include one or more user-actuatable control elements via which a user can provide input. For example, a conventional game controller that is designed to be held in two hands (sometimes referred to as a "gamepad", "control pad", or "joypad") may include one or more user-actuatable buttons, triggers, thumbsticks, directional pads, touch pads, and the like. Each of these control elements may be manipulated by a user to generate various control signals for interacting with a video game.

As noted above, some user input devices, such as game controllers, include at least one thumbstick. A thumbstick (which may also be referred to as an "analog thumbstick", "analog stick", "joystick," "control stick," or simply a "stick") is a game controller component that can be manipulated by a user along two-axes for controlling or otherwise interacting with a video game or other application.

Different users have different preferences in what they consider to be the "best" tension for a thumbstick on a game controller. A thumbstick with higher tension provides greater resistance to being tilted by a user's finger relative to a thumbstick with lesser tension. Some game players (e.g., gamers) prefer higher tilt tension in a thumbstick, while others prefer a lower tilt tension. Accordingly, embodiments provide a thumbstick system/assembly that enables the end user to adjust the tension to their preference. Furthermore, embodiments enable a substantially constant tension to be felt throughout the full motion of the thumbstick.

In embodiments, the thumbstick tilt tension may be adjusted without disassembly of the thumbstick assembly and/or use of a tool, while in other embodiments, a tool may be used to adjust the tilt tension. In embodiments, a tilt tension adjustment mechanism may be attached to the thumbstick assembly, incorporated in the thumbstick assembly, or coupled to the thumbstick assembly in another manner. The adjustment may be performed via the thumbstick cap, a user's fingers, and/or a tool that interfaces with the thumbstick assembly to create the motion required to adjust tension of the compression spring.

In an embodiment, a thumbstick assembly (e.g., a joystick assembly/switch and a thumbstick cap) contains a means to dynamically adjust tension within the geometry of the thumbstick assembly. For instance, a movable pin that protrudes from the thumbstick post may be present, such that when the pin is moved vertically (along the post axis), the tilt tension of the thumbstick is adjusted. Examples of components that may be present to adjust thumbstick tilt tension include a movable pin, a compression spring, a repositionable body (e.g., a set screw), a compression disk, a plastic housing containing the components, etc.

In embodiments, the adjustable tilt tension thumbstick is configured to maintain a constant, or near constant, tilt tension as the thumbstick cap is moved. In embodiments, the thumbstick cap may contain the all or parts of the adjustment mechanism (e.g., screw threads, a tool, a cam/follower geometry) to allow the user to adjust the tension of the thumbstick. In other embodiments, at least some of the adjustment mechanism is contained elsewhere.

In an embodiment, existing parts of a thumbstick assembly may be modified to enable tilt adjustment, including changing an existing thumbstick "post" or "shaft" that interfaces with the thumbstick cap in a two part configuration, including a pin capable of moving in the Z- or vertical direction to set a particular tension by compressing an internal compression spring to a set length that corresponds to the desired tension in the switch. The thumbstick assembly may be modified to increase a vertical engagement with the pin, the joystick assembly may be modified to increase the potential stroke distance of the compression spring, and the compression spring itself may be modified (e.g., length, tension).

The thumbstick cap may be modified to enable the motion used to adjust the thumbstick between tilt tensions. This may be accomplished in various ways, such as by the incorporation of one or more threaded components. In another embodiment, a compressive member may be inserted between the switch body and the thumbstick cap such that a mechanism within the cap compresses this member, creating tighter or looser tension. Such configuration may yield a non-constant tilt tension, and therefore be less desirable to an end user.

Embodiments are applicable to all types of user input devices that include one or more thumbsticks. For instance, FIGS. 1A and 1B show front and side views, respectively, of an example game controller 100 that includes first and second thumbsticks 102A and 102B. Game controller 100 is an example user input device, and is provided for purposes of illustration, and is not intended to be limiting. User input devices to which embodiments apply (e.g., game controllers, remote control devices) may have different shapes, different sizes, different numbers and/or placements of user interface features (buttons, knobs, switches, triggers, pads, sticks, etc.), and/or other differences from game controller 100 shown in FIGS. 1A and 1B. Thumbstick-related functionality of game controller 100 is described as follows.

Thumbsticks 102A and 102B are each a thumbstick that can be tilted by a finger of a user, typically the thumb, but sometimes with another finger of the user. In the current example, thumbsticks 102A and 102B are configured to tilt or pivot, when moved by a finger, relative to a stationary pivot point at an end of the thumbstick. In FIGS. 1A and 1B, the hinge/pivot is internal to a housing 104 of game controller 100, and thus not visible (example hinge/pivot is visible in other figures). In other embodiments, other thumbstick movement enabling mechanisms may be used.

In FIGS. 1A and 1B, thumbsticks 102A and 102B are shown in the center, non-tilted position. When tilted (e.g., pushed sideways) by a finger of a user, thumbsticks 102A and 102B may tilt in any direction from center, and may be tilted any degree/angle of tilt until a stop angle is reached. Tilting one or more of thumbsticks 102A and 102B may cause an action out of a game (e.g., browsing of television channels) or within a game being played by the user, such as the aiming of a weapon, a particular motion of a character (e.g., running), and/or other out-of-game or in-game action.

Thumbsticks 102A and 102B can be single piece or can be assemblies, manufactured from any suitable material(s), including plastic (e.g., injection molded), metal or combination of metals/alloys, etc. Housing 104 can be a single piece case or housing, or a case or housing formed of two more interlocking pieces (e.g., top and bottom portions). Housing 104 may be made from any suitable material(s), including plastic (e.g., injection molded), metal or combination of metals/alloys, etc. Housing 104 may include mechanical and electrical components (e.g., joystick assembly containing sensors) that measure the degree of tilt of thumbsticks 102A and 102B, and transmit an indication of the measure tilt (e.g., to one or more processors contained in game controller 100 and/or in a remote component).

Figure 2A:
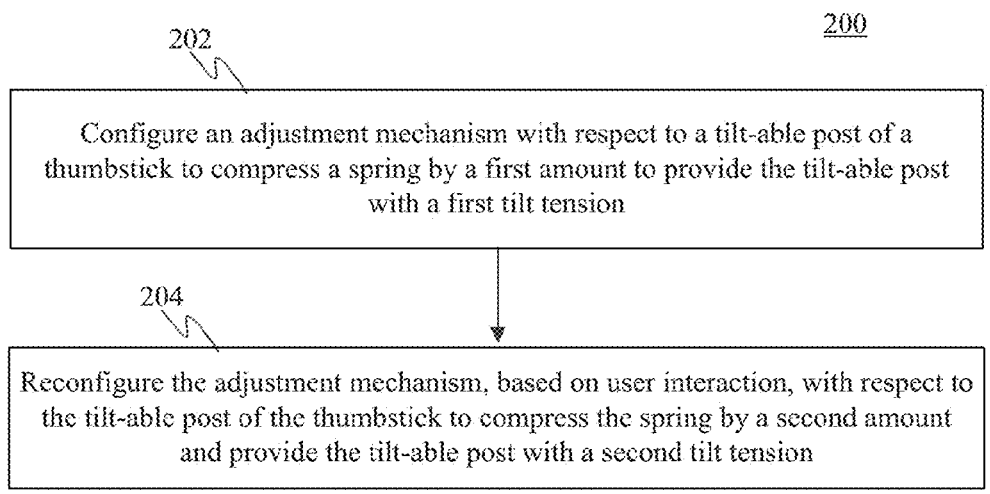
FIG. 2A shows a flowchart providing a process for the adjustment of thumbstick tilt tension, according to an example embodiment.

Embodiments can operate in various ways to enable adjustment of thumbstick tilt tension. For example, FIG. 2A shows a flowchart providing a process for the adjustment of thumbstick tilt tension, according to an example embodiment. The user input devices described herein, such as game controller 100, may be configured to operate according to flowchart 200, in embodiments. Further structural and operational embodiments will be apparent to persons skilled in the relevant art(s) based on the following description of flowchart 200.

Flowchart 200 begins with step 202. In step 202, an adjustment mechanism is configured with respect to a tilt-able post of a thumbstick to compress a spring by a first amount to provide the tilt-able post with a first tilt tension. A thumbstick of a game controller (or other type of thumbstick), such as one or both of thumbsticks 102A and 102B, typically contains an internal spring that maintains the thumbstick in a central, non-tilted position. The internal spring is compressed when the thumbstick is tilted by a user's finger, and provides a corresponding resistance or "tilt tension" that is felt by the user's finger. In embodiments, a game controller may include a tilt tension adjustment mechanism. The tilt tension adjustment mechanism is configured to change the compression that the spring takes on at any given point by a constant amount. The tilt tension adjustment mechanism may have an initial, default setting that provides a thumbstick, such as one or both of thumbsticks 102A and 102B in FIGS. 1A and 1B, with a particular (e.g., predetermined) amount of tilt tension. For example, the tilt tension adjustment mechanism may set (e.g., compress) a compression spring contained in the length of the thumbstick to a particular amount of compression (e.g., a full, uncompressed length of the spring, or a shortening of the spring to a length that is less than its uncompressed length). A user that pushes the thumbstick sideways with a finger feels the tilt tension as a particular amount of resistance to the pushing, which is dictated by the amount of compression of the compression spring. The greater the amount of compression of the spring, the greater the tilt tension and resistance to tilting of the thumbstick. The lesser the amount of compression of the spring, the lesser the tilt tension and resistance to tilting of the thumbstick. The least amount of tilt tension is provided when the spring is in an uncompressed configuration.

In step 204, the adjustment mechanism is reconfigured, based on user interaction, with respect to the tilt-able post of the thumbstick to compress the spring by a second amount and provide the tilt-able post with a second tilt tension. In an embodiment, the tilt tension adjustment mechanism enables the user to change the tilt tension of the thumbstick by changing the amount of compression of the spring contained in the length of the thumbstick. For example, the user may be enabled to increase the tilt tension to a particular amount by increasing the compression of the spring (e.g., shortening of the length of the spring further), or to decrease the tilt tension to a particular amount by decreasing the compression of the spring (e.g., allowing the length of the compressed spring to increase). The user pushing the thumbstick sideways with a finger feels the change in tilt tension as an amount of resistance to the pushing, corresponding to the changed amount of compression of the compression spring. If the compression of the spring is increased, the tilt tension and resistance to tilting of the thumbstick is increased. If the compression of the spring is decreased, the tilt tension and resistance to tilting of the thumbstick is decreased.

Figure 3:
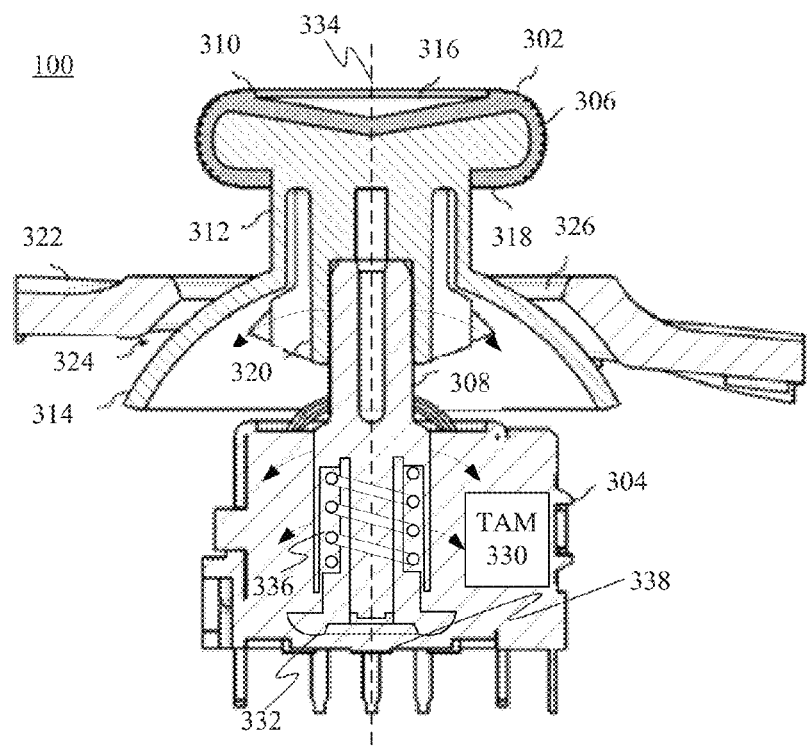
FIG. 3 shows a cross-sectional view of a portion of a game controller that includes a thumbstick configured with a tilt tension adjustment mechanism, according to an example embodiment.

By way of example, FIG. 3 shows a cross-sectional view of a portion of game controller 100 that includes a thumbstick 302. Thumbstick 302 comprises a joystick assembly 304 and a thumbstick cap 306 that is attached thereto. Joystick assembly 304 is an electronic component that is mounted on a printed circuit board (not shown in FIG. 3) that is disposed within a housing of game controller 100. Joystick assembly 304 includes a tilt-able post (or "shaft") 308 and a plurality of sensors in the form of potentiometers and/or other position detectors (e.g., Hall effect sensors, mechanical switches, optical sensors). Tilt-able post 308 includes a base portion 332 having a disk shape (e.g., curved at the edges, relatively flat at center) bottom that is a pivot surface for the tilting of tilt-able post 308 in any of three hundred and sixty (360) degrees from a default "center" position. In particular, tilt-able post 308 base portion 332 pushes against a bottom plate 338 under the load of a compression spring 336 providing a force pushing tilt-able post 308 back towards its default position. The position sensors may utilize continuous electrical activity, or other mechanisms, to generate an analog input control signal based on a position of tilt-able post 308 in relation to the default "center" position.

Thumbstick cap 306 comprises a generally disk-shaped top 310 that is connected to a dome-shaped base 314 via a cylindrical stem 312 of top 310. Top 310 includes a first surface 316 and an opposing second surface 318. First surface 316 is designed to be manipulated by a user's finger (e.g., a user's thumb) and in this example is concave in shape. Thumbstick cap 306 also includes a connector 320 that extends perpendicularly from second surface 318 into a space defined by stem 312 and base 314. Thumbstick cap 306 and post 308 may be connected in any suitable manner. In the example of FIG. 3, connector 320 defines a cavity into which post 308 is inserted, thereby mounting thumbstick cap 306 on joystick assembly 304. In some embodiments thumbstick cap 306 and post 308 may be formed together as a single part (e.g., by plastic injection molding). In other embodiments, as described herein, thumbstick cap 306 (including stem 312) is a physically separate piece from dome-shaped base 314 (including connector 320), which may be joined together. By manipulating top 310 of thumbstick cap 306, a user can cause post 308 to deviate from its default "center" position, thereby generating a two-dimensional analog input control signal. Post 308 is biased by compression spring 336 such that when there is no force being applied to post 308, post 308 will revert to its default "center" position.

As further shown in FIG. 3, the housing of game controller 100 includes a top case 322. Top case 322 includes a generally conical or volcano-shaped portion that surrounds an aperture 324. Top 310 and stem 312 of thumbstick cap 306 extend outside of the housing of game controller 100 via aperture 324, and are thus accessible for user manipulation. A portion of base 314 of thumbstick cap 306 is also externally exposed via aperture 324. An edge 326 of top case 322 that surrounds aperture 324 limits the degree to which a user can displace thumbstick cap 306 in any given direction (i.e., a stop angle) since, at a certain degree of displacement, stem 312 of thumbstick cap 306 will collide with edge 326. Dome-shaped base 314 serves to prevent dirt or foreign objects from entering game controller 100 as well as protecting the internals of game controller 100 from electrostatic discharge and providing a more aesthetic visual appearance. Some embodiments may not include dome-shaped base 314. Dome-shaped base 314 of thumbstick cap 306 is sized such that, no matter what the degree or direction of displacement of thumbstick cap 306, the interior of the housing of game controller 100 will not be exposed via aperture 324.

In one implementation, both the housing of game controller 100 and thumbstick cap 306 are formed from a thermoplastic material, such as PC/ABS (a compounded blend of polycarbonate (PC) and acrylonitrile butadiene styrene (ABS)). PC/ABS is one of the most widely used industrial thermoplastics and has been found to be especially suitable for molded housings and parts that require high impact strength. The PC component of PC/ABS provides toughness while the ABS component helps make the material more moldable. In another conventional implementation, the housing of game controller 100 is formed from PC/ABS while thumbstick cap 306 is formed from ABS, which is typically less expensive than PC/ABS.

A tilt adjustment mechanism (TAM) 330 is shown in FIG. 3 in joystick assembly 304. Note that in other embodiments, TAM 330 may be present in thumbstick cap 306, or may have a first portion included in joystick assembly 304 and a second portion included in thumbstick cap 306. TAM 330 enables a tilt tension of thumbstick 302 to be adjusted by interaction by a user, according to embodiments. For instance, TAM 330 may include a movable pin that protrudes from post 308. When the pin is shifted along the axis 334 of post 308, the tilt tension of thumbstick 302 is adjusted. Examples of components that may be included in TAM 330 to adjust thumbstick tilt tension include a movable pin, a compression spring, a repositionable body (e.g., a set screw), a magnet, a compression disk, patterned edges, etc.

Figure 2B:
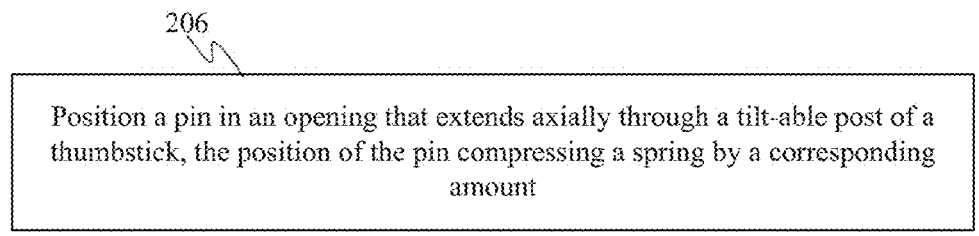
FIG. 2B shows a process for the adjustment of thumbstick tilt tension via a moveable pin and compression spring, according to an example embodiment.

For instance, FIG. 2B shows a step 206 for the adjustment of thumbstick tilt tension via a moveable pin and compression spring, according to an example embodiment. Step 206 may be performed during each of steps 202 and 204 of flowchart 200 in embodiments.

In step 206, a pin is positioned in an opening that extends axially through a tilt-able post of a thumbstick, the position of the pin compressing a spring by a corresponding amount. In an embodiment, a user may interact (by thumbstick top, fingers, using a tool, etc.) with a pin located in post 308 to move the pin to a particular location along the length of post 308 (or even partially outside of post 308). The position in which the pin is placed causes spring 336 to be compressed by a corresponding amount, which in turn, causes thumbstick 302 to have a corresponding amount of tilt tension.

Figure 4:
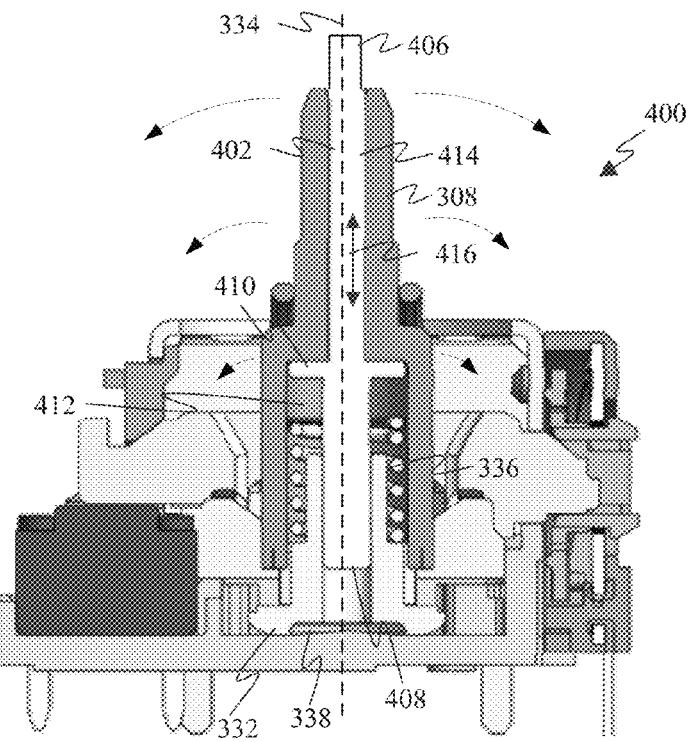
FIG. 4 shows a cross-sectional view of a joystick assembly that contains a pin and a spring configured to enable thumbstick tilt tension adjustment, according to an example embodiment.

For example, FIG. 4 shows a cross-sectional view of a joystick assembly 400 that contains a pin 402 configured to enable thumbstick tilt tension adjustment, according to an example embodiment. Joystick assembly 400 is an example of joystick assembly 304 and pin 402 is an example of TAM 330 of FIG. 3. A thumbstick cap is not shown in FIG. 4 for ease of illustration. As shown in FIG. 4, joystick assembly 400 includes post 308 and spring 336. Pin 402 resides in a post opening 414 that extends through post 308 along axis 334 of post 308. Pin 402 has opposing first and second ends 406 and 408, and has a flange 410 (similar to a washer) that extends (e.g., wraps) around at least a portion of a circumference of pin 308 between first and second ends 406 and 408. Spring 336 coils around the circumference of pin 402 inside a chamber 412 located within post 308. Spring 336 may be compressed between flange 410 and a surface of base portion 332 (e.g., a top ledge of base portion 332) of tilt-able post 308. Pin 402 is movable along post axis 334 (as indicated by double-headed arrow 416) through post opening 414 from a first position (e.g., the position shown in FIG. 4; an uppermost position in chamber 412 where flange 410 contacts an inside (e.g., upper) surface) to one or more positions closer to the lowest point of base portion 332. Pin 402 moves against resistance by spring 336, to modify the tilt tension of post 308 to an amount dictated by the amount of compression of spring 336 (shown not compressed in FIG. 4).

In some implementations, flange 410 may be located at second end 408 of pin 402. In some of these implementations, spring 336 may coil beneath pin 402 rather than around pin 402. In some of these implementations, pin 402 may not have a flange 410, but instead spring 336 is compressed between second end 408 of pin 402 and base portion 332. Alternatively, an additional piece such as a small disk may be placed below end 408 of pin 402 and above spring 336 so as to translate force and displacement between spring 336 and pin 402. In general, pin 402 may take any suitable elongated form that serves to compress spring 332.

Spring 336 and pin 402 may each be made of any suitable material, such as a metal (e.g., aluminum, steel) or metal alloy, a plastic, a resin, or other material.

User input devices can be configured in various ways to perform the processes of FIGS. 2A and 2B and may be configured with adjustable thumbstick tilt tension in various ways. Example embodiments are described in the following subsections. These example embodiments are provided for purposes and are not intended to be limiting. Furthermore, the embodiments described herein may be combined in any manner.

A. Example Thumbstick Cap Embodiments for Enabling Tilt Tension Adjustment

In embodiments, a portion of TAM 330 (FIG. 3) may be included in a thumbstick top (e.g., top 310 of FIG. 3) In one embodiment, a thumbstick top may include a fixed length protrusion used to set compression of spring 336 to a corresponding compression level, thereby dictating a particular amount of thumbstick tilt tension. Accordingly, a thumbstick top may be changed out for a different thumbstick top by a user to switch between different, desired thumbstick tilt tensions.

Figure 5:
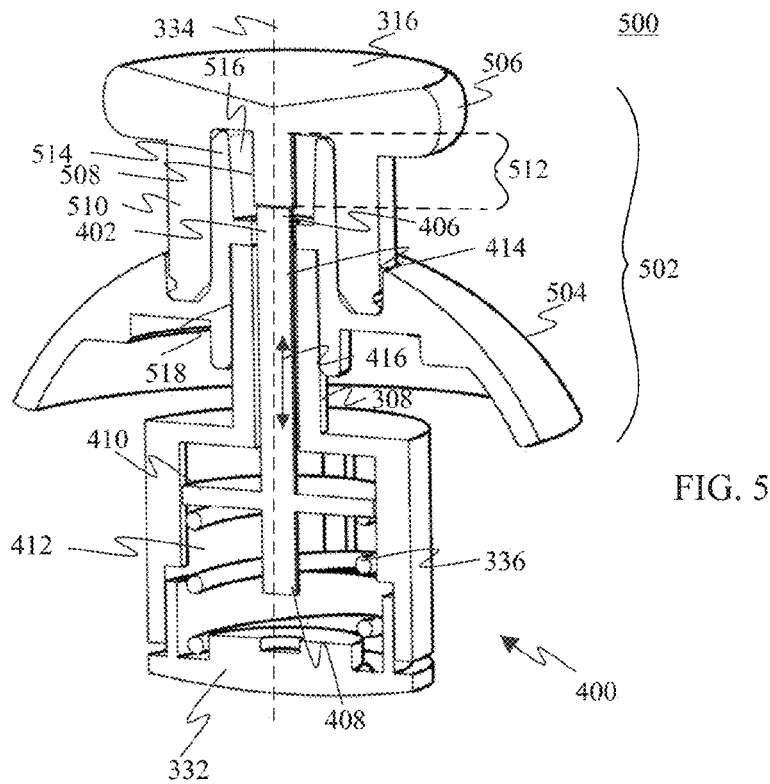
FIG. 5 shows a cross-sectional perspective view of a joystick assembly and a thumbstick cap configured with a first thumbstick top that includes a protrusion having a first length configured to enable a first amount of thumbstick tilt tension, according to an example embodiment.

For instance, FIG. 5 shows a cross-sectional perspective view of a portion of a thumbstick assembly 500, according to an example embodiment. Thumbstick assembly 500 includes joystick assembly 400 and a thumbstick cap 502 that includes a first thumbstick top 506. Thumbstick top 506 includes a protrusion 508 having a first length 512 configured to enable a first amount of thumbstick tilt tension. As shown in FIG. 5, thumbstick base 504 is connected to post 308 of joystick assembly 400. An open cylindrical stem 510 of thumbstick top 506 receives a protruding hollow cylindrical portion 514 of thumbstick base 504, such that thumbstick top 506 is removably connected to thumbstick base 504. Hollow cylindrical portion 514 forms a first recess 516 atop thumbstick base 504. Furthermore, hollow cylindrical portion 514 has an opening in a bottom inner surface, which is open through thumbstick base 504 into a second recess 518 at the bottom of thumbstick base 504. Pin 402 extends from post 308 though the opening through thumbstick base 504 into first recess 516.

Thumbstick top 506 is manipulable (e.g., tilt-able) by a user to cause a displacement of post 308 from the default position (vertically upright). Furthermore, the attachment of thumbstick top 506 to thumbstick base 504 sets a tilt tension for thumbstick assembly 500. For example, protrusion 508 underneath thumbstick top 506 (within an open cylindrical stem 510 of thumbstick top 506) contacts first end 406 of pin 402. By a user pushing thumbstick top 506 onto protruding hollow cylindrical portion 514 of thumbstick base 504, pin 402 is repositioned along post axis 334 in post opening 414, against resistance by spring 336, by a distance corresponding to length 512 of protrusion 508. Spring 336 is therefore set to a particular amount of compression, which causes a corresponding amount of tilt tension in post 308.

Accordingly, thumbstick top 506 may be connected to thumbstick cap 504 (at protruding hollow cylindrical portion 514) to set thumbstick assembly 500 to have a particular tilt tension that corresponds to the length 512 of protrusion 508.

Figure 6:
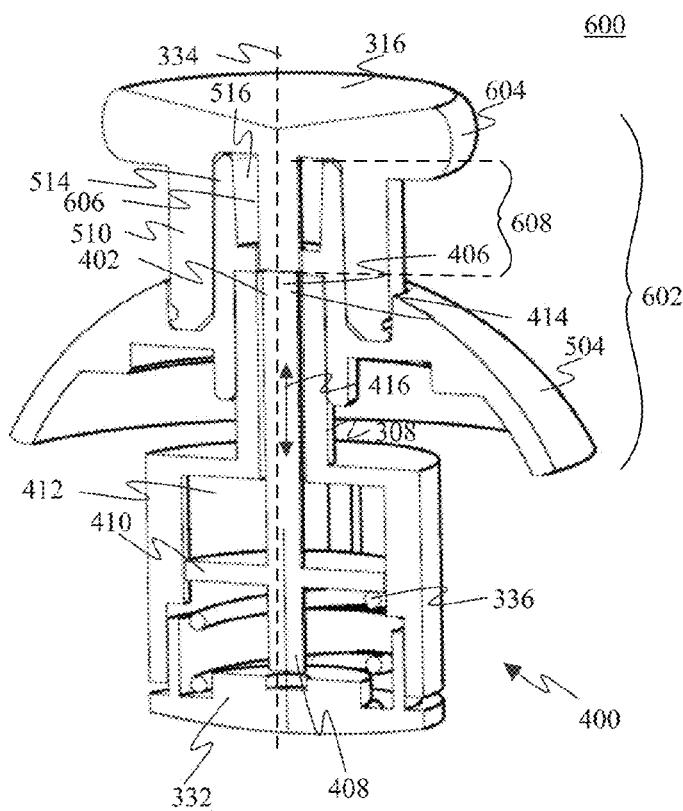
FIG. 6 shows a cross-sectional perspective view of the joystick assembly of FIG. 5 and a thumbstick cap configured with a second thumbstick top that includes a protrusion having a second length configured to enable a second amount of thumbstick tilt tension, according to an example embodiment.

FIG. 6 shows a cross-sectional perspective view of a portion of thumbstick assembly 600, according to an example embodiment. Assembly 600 includes joystick assembly 400 and a thumbstick cap 602 that includes a second thumbstick top 604 and thumbstick base 504. Thumbstick top 604 includes a protrusion 606 having a second length 608 configured to enable a second amount of thumbstick tilt tension. Accordingly, thumbstick assembly 600 is configured the same as thumbstick assembly 500 of FIG. 5, with thumbstick top 604 in FIG. 6 replacing thumbstick top 506 of FIG. 5.

As such, by a user pushing thumbstick top 604 onto protruding hollow cylindrical portion 514 of thumbstick base 504, pin 402 is repositioned along post axis 334 in post opening 414, against resistance by spring 336, by a distance corresponding to length 608 of protrusion 606. Spring 336 is therefore set to a particular amount of compression, which causes a corresponding amount of tilt tension in post 308. Because length 608 of protrusion 606 is greater than length 512 of protrusion 508 (FIG. 5), spring 336 is compressed more in thumbstick assembly 600 relative to thumbstick assembly 500 (FIG. 5). Therefore, post 308 in thumbstick assembly 600 has a greater tilt tension than does post 308 in thumbstick assembly 500.

Accordingly, thumbstick tops having bottom side protrusions of selected lengths may be connected to a thumbstick cap to cause corresponding tilt tensions in a thumbstick. Any number of thumbstick tops may be used to create any number of corresponding thumbstick tilt tensions. A user may apply any of the thumbstick caps at any time to achieve a desired thumbstick tilt tension.

Note that in other embodiments, rather than being a thumbstick top being pushed onto a thumbstick base (e.g., by hand), a thumbstick top may be screwed onto (threaded) or attached to the thumbstick base in another manner. Different thumbstick tops may attach to a same thumbstick base in different manners. The mating interface between the thumbstick tops and the thumbstick base may take any suitable form. In some embodiments, the thumbstick top may attach directly to the thumbstick post via any suitable manner, and no thumbstick base may be present.

In some embodiments, a protrusion may not be present. Instead the height of the underside of the thumbstick top when installed on the thumbstick base or thumbstick post may be varied across different thumbstick tops in order to achieve the a plurality of pin displacements, resulting in a plurality of spring compressions and plurality of thumbstick tensions in the same manner as if a protrusion was used.

In still other embodiments, recesses of varying depths that set the pin to different heights, rather than protrusions that sets the pin to different heights, may be used. In some embodiments, the same thumbstick base or post may accept a variety of thumbstick tops that make use of a combination of different underside heights, protrusions, and/or recesses.

In another embodiment, a thumbstick top may support a repositionable body, such as a set screw. The repositionable body may be repositioned to change compression of spring 336 to various corresponding compression levels, thereby dictating particular amounts of thumbstick tilt tension.

Figure 7:
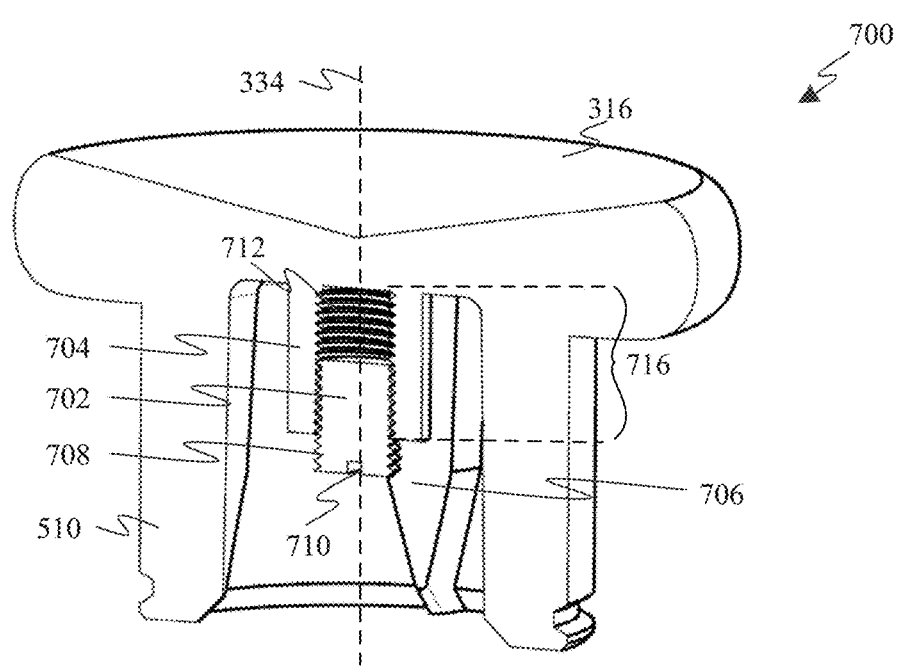
FIG. 7 shows a cross-sectional perspective view of a thumbstick top supporting a repositionable body in a recess that may be repositioned in the recess to change thumbstick tilt tension, according to an example embodiment.

For instance, FIG. 7 shows a cross-sectional perspective view of a thumbstick top 700, according to an example embodiment. As shown in FIG. 7, thumbstick top 700 supports a repositionable body 702 in a recess 712 formed within a protrusion 704 extending from underneath thumbstick top 700 within open cylindrical stem 510. Repositionable body 702 may be repositioned along axis 334 extending vertically through recess 712 to configure thumbstick tilt tension. For instance, in the example of FIG. 7, recess 712 is cylindrical and threaded, and has a length 716. Repositionable body 702 is cylindrical and has a threaded cylindrical outer surface 708. As such, in an embodiment, repositionable body 702 may be applied to recess 712, and turned (e.g., by a tool such as a screw driver applied to slot 710 in an end of repositionable body 702) to be secured in recess 712, and to be repositioned upwards or downwards along axis 334 in recess 712.

Figure 8:
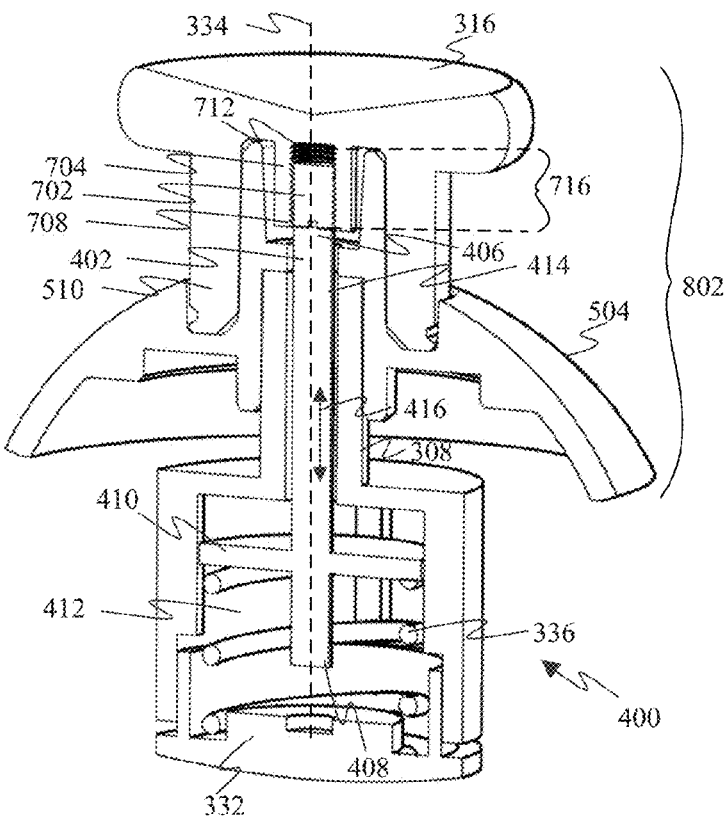
FIGS. 8 and 9 shows cross-sectional perspective views of a joystick assembly and a thumbstick cap supporting a repositionable body at first and second positions, respectively, to enable corresponding first and second levels of thumbstick tilt tension, according to example embodiments.
Figure 9:
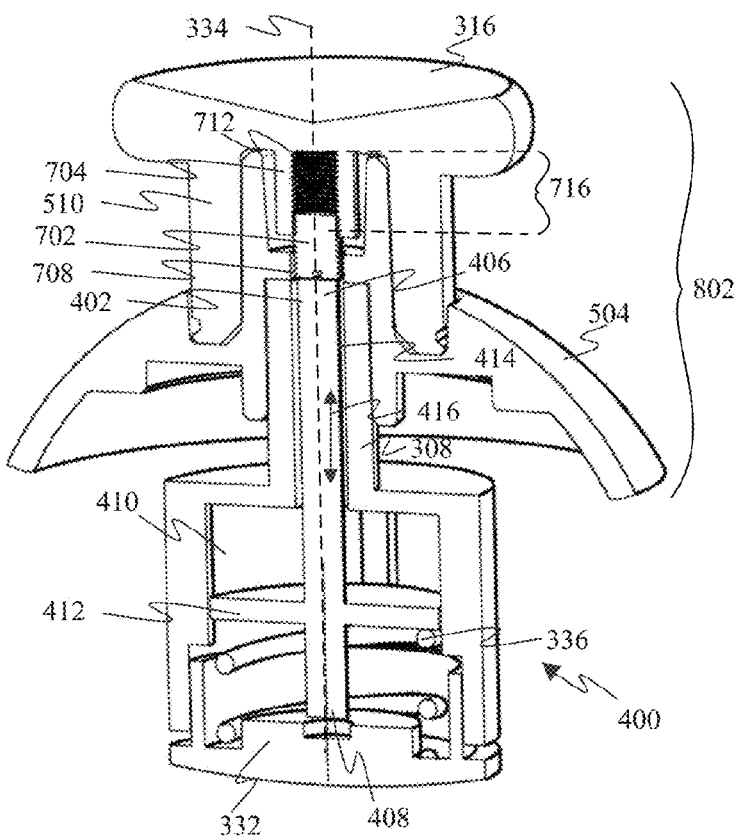

FIGS. 8 and 9 shows cross-sectional perspective views of a portion of joystick assembly 400 with a thumbstick cap 802 attached thereto, according to example embodiments. Thumbstick cap 802 includes thumbstick top 700 and thumbstick base 504. As shown in FIGS. 8 and 9, thumbstick top 700 supports repositionable body 702 at first and second positions, respectively, to enable corresponding first and second amounts of thumbstick tilt tension.

In particular, in each of FIGS. 8 and 9, repositionable body 702 is at least partially inserted in recess 712, is secure in recess 712 (e.g., held in place by screw threads), and is in contact with first end 406 of pin 402. Repositionable body 702 is repositionable along length 716 of recess to reposition pin 402 along post axis 334 in post opening 414, against the resistance by spring 336. Spring 336, which is at least partially compressed, exerts a force against flange 410, to push pin 402 against the end of repositionable body 702. Pin 402 is repositioned along axis 334 by a distance corresponding to a position of repositionable body 702 along length 716 of recess 712.

For example, in FIG. 8, repositionable body 702 is positioned (e.g., screwed) deeper into recess 712 than in FIG. 9. As such, pin 402 is inserted less deeply in post opening 414 through post 308 in FIG. 8 relative to FIG. 9, leading to spring 336 being less compressed in FIG. 8 (between flange 410 and base portion 332 of post 308) relative to FIG. 9. Accordingly, the tilt tension of post 308 is greater in FIG. 9 relative to FIG. 8. By moving repositionable body 702 upward and downward in recess 712 along axis 334, any suitable tilt tension (in a range of possible tilt tensions) may be selected.

In another embodiment, a plurality of attachable/interchangeable bodies of different heights may be associated with a thumbstick top, rather than a single repositionable body, such that when each attachable body is attached to the thumbstick top, and the thumbstick top is attached to the thumbstick base or post, the end of the attachable body adjusts the position of the pin (according to the height of the body), the compression of the spring, and the tension of the thumbstick in a manner substantially similar to that of the repositionable body.

The attachable bodies may be attached in any suitable manner. Non-limiting examples include friction fit, screw threads, or magnetic attachment. The attachable bodies may or may not be designed to be repositionable. The same attachable body may be designed to fit a plurality of thumbstick tops.

In another embodiment, the attachable bodies of different heights may attach to the pin or to another movable mechanism disposed above the pin on the thumbstick assembly such that when the thumbstick top is attached to the thumbstick base or thumbstick post, the different heights of the attachable bodies each push the pin by a different amount, resulting in a different compression of the spring and a different thumbstick tension. Again, the attachable bodies may be attached in any suitable manner, including the any manner described elsewhere herein, or otherwise known. In some embodiments, an attachable body may not be attached at all. Instead an attachable body may be loosely disposed in a cavity in the thumbstick top, thumbstick base, or thumbstick post and have the same effect. In some embodiments multiple bodies may be used together to achieve an additive adjustment to the compression of the spring.

Repositionable body 702 (and the above-described attachable bodies) may be made of any suitable material, such as a metal (aluminum, steel, etc.) or metal alloy, a plastic, a resin, or other material.

B. Example Recessed Post Embodiments for Enabling Tilt Tension Adjustment

In embodiments, a portion of TAM 330 (FIG. 3) may be included in a thumbstick base (e.g., base 314 of FIG. 3). In one embodiment, the thumbstick base includes a recess in which a repositionable body resides. The body can be repositioned to set compression of spring 336 to a corresponding amount, thereby dictating a particular amount of thumbstick tilt tension.

Figure 10:
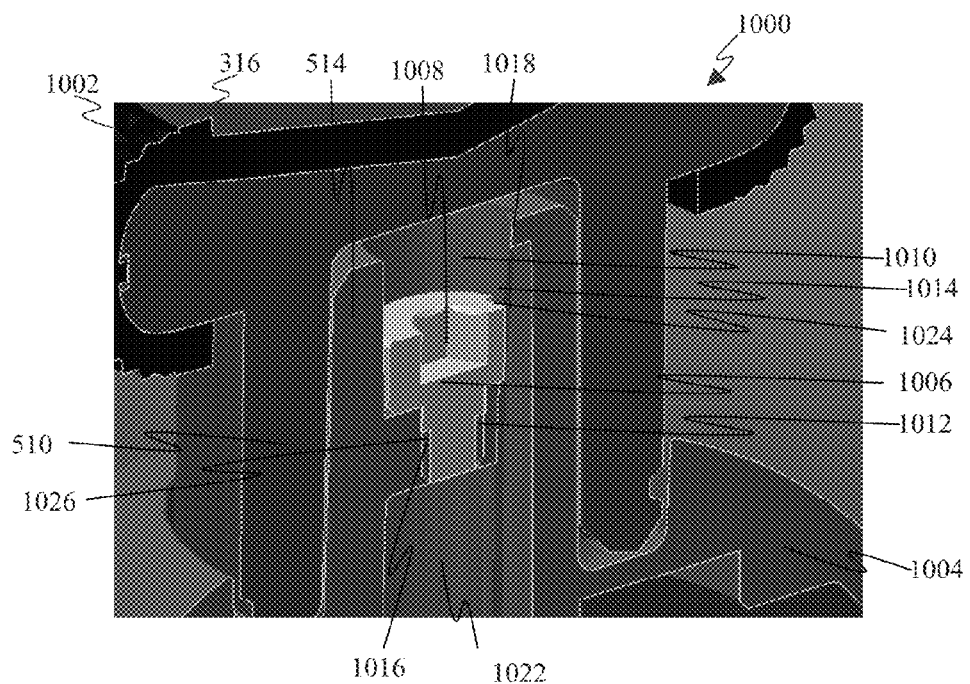
FIG. 10 shows a cross-sectional perspective view of a portion of a thumbstick top and a thumbstick base that includes a recess supporting a body having a threaded portion, the body being repositionable to adjust thumbstick tilt tension, according to an example embodiment.

For example, FIG. 10 shows a cross-sectional perspective view of a portion of a thumbstick cap 1000, according to an example embodiment. Thumbstick cap 1000 includes a thumbstick top 1002 and a thumbstick base 1004. Thumbstick base 1004 includes a recess 1010 supporting a repositionable body 1006. Repositionable body 1006 includes a threaded portion 1016, and is repositionable to adjust thumbstick tilt tension. Thumbstick cap 1000 is further described as follows.

Thumbstick top 1002 is removably connected to protruding hollow cylindrical portion 514 atop thumbstick base 1004. Hollow cylindrical portion 514 includes a central first recess 1010 open in the top end. Protruding hollow cylindrical portion 514 has an opening 1026 in a bottom inner surface of recess 1010, which is open through thumbstick base 1004 into a second recess 1022 underneath the dome shape of thumbstick base 1004. Second recess 1022 is cylindrical in shape in the example of FIG. 10, but can have other shapes in embodiments. Thumbstick base 1004 may receive post 308 (FIG. 3; not shown in FIG. 10) in second recess 1022 in a similar manner as thumbstick base 504 is mounted to post 308 in FIGS. 8 and 9. Opening 1026 includes a threaded portion 1012.

Though not shown in FIG. 10, pin 402 (FIG. 4) inside post 308 (not shown in FIG. 10) extends from post 308 though opening 1026. Repositionable body 1006 is inserted in first recess 1010, and has a portion that extends into opening 1026. Repositionable body 1006 has a first end with a tool feature 1008 (an Allen wrench hex socket, a slot, etc.) and a second end that contacts pin 402 in second recess 1022 (though opening 1026). Repositionable body 1006 may be repositioned upward or downward in recess 1010 by a user accessing tool feature 1008 with a tool (an Allen wrench, a screwdriver, etc.). For example, the user may turn repositionable body 1006, and the engagement of threaded portions 1016 and 1012 causes repositionable body 1006 to be moved upward or downward in recess 1010, thereby moving pin 402 upward or downward in post 308, changing a compression of spring 336 (not visible in FIG. 10), and thereby changing a tilt tension of the thumbstick.

Note that as described above, in the embodiment of FIG. 10, repositionable body 1006 is threaded at threaded portion 1016. As such, if repositionable body 1006 is turned to move upward far enough to disengage from threaded portion 1012, repositionable body 1006 may fall out of place in recess 1010. Accordingly, to keep repositionable body 1006 from falling completely out of recess 1010 (e.g., when thumbstick top 1002 is removed), a restraining feature 1018 (e.g., a bump, a lip, a pin) may be present at a rim of recess 1010, and repositionable body 1006 may have a complementary feature 1024 (e.g. a notch, a slot) along its length so that repositionable body 1006 can be slid past restraining feature 1018 (when features 1018 and 1024 are lined up), and then held contained within recess 1010. To remove repositionable body 1006 from recess 1010, features 1018 and 1024 would have to be lined up so that repositionable body 1006 could pass restraining feature 1018.

In some embodiments, and as described elsewhere herein, thumbstick top 1002 need not be removable. Instead, thumbstick top 1002 may be permanently connected to thumbstick base 1004. In some embodiments, thumbstick cap 1002 may be formed as a single part (e.g., by injection molding). For repositionable body 1006 to be installed into thumbstick cap 1002, an access hole may be formed in the top of thumbstick cap 1002.

In some embodiments, the pin and repositionable body 1006 may be connected. Furthermore, in some embodiments, the pin and repositionable body 1006 may be formed as a single part (i.e. a continuous piece of metal).

Figure 11:
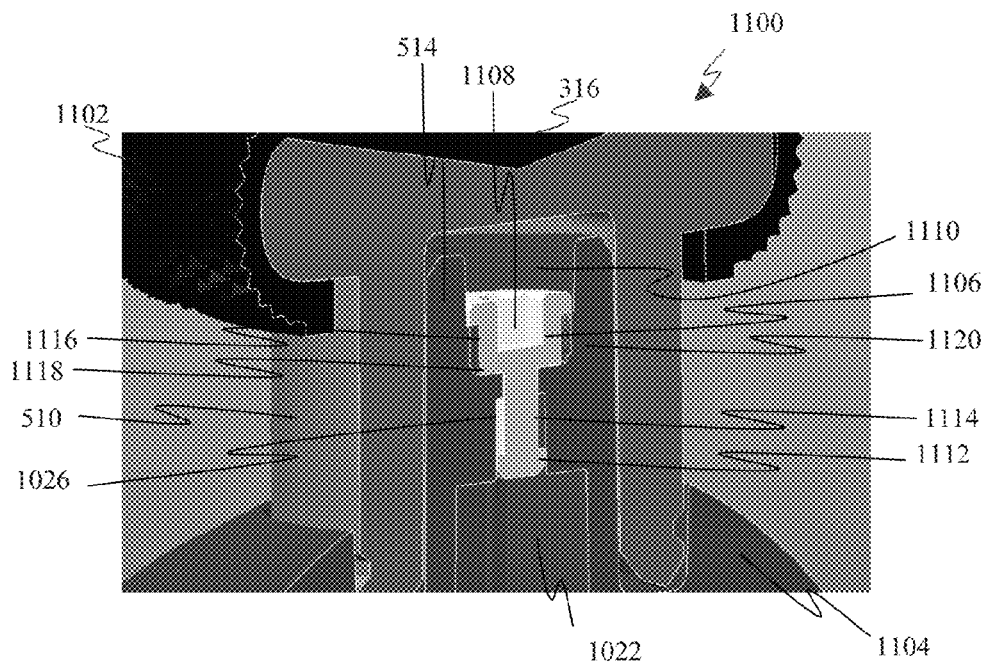
FIG. 11 shows a cross-sectional perspective view of a portion of a thumbstick top and a thumbstick base that includes a recess supporting a body having first and second threaded portions, the body being repositionable to adjust thumbstick tilt tension, according to an example embodiment.

FIG. 11 shows an embodiment similar to FIG. 10, with a different type of restraining mechanism. In FIG. 11, a cross-sectional perspective view of a portion of a thumbstick cap 1100 is shown. Thumbstick cap 1100 includes a thumbstick top 1102, and a thumbstick base 1104 that includes a recess 1110 supporting a repositionable body 1108. Thumbstick top 1102 and thumbstick base 1104 are generally similar to thumbstick top 1002 and thumbstick base 1004 of FIG. 10, with differences noted as follows. For example, thumbstick base 1104 includes second recess 1022 and a first recess 1110. First recess 1110 is similar to recess 1010 of FIG. 10, but does not include a restraining feature. Instead, recess 1110 includes a lower portion that is a threaded portion 1118. Furthermore, opening 1026 between recesses 1110 and 1022 includes a threaded portion 1114.

Furthermore, repositionable body 1106 is generally similar to repositionable body 1006 of FIG. 10, with a threaded portion 1112 similar to threaded portion 1012, the addition of a second threaded portion 1116, and no restraining feature 1018 present. In FIG. 11, repositionable body 1106 can be inserted into recess 1110 and opening 1026, and turned in a first direction to thread threaded portion 1112 past threaded portion 1114 in opening 1026. In this position, repositionable body 1106 is held restrained between threaded portions 1114 and 1118 of thumbstick body 1104, and contacts pin 402 (not shown in FIG. 11). Repositionable body 1106 can be inserted further until threaded portion 1116 engages threaded portion 1118 of recess 1110, and can be turned in a second (opposite) direction to further engage threaded portions 1116 and 1118, to push pin 402 against spring 336, thereby increasing a tilt tension of the thumbstick.

FIGS. 12-15 further illustrate the repositioning of repositionable body 1106. FIGS. 12-15 show cross-sectional perspective views of a portion of thumbstick base 1004 with recess 1022 supporting repositionable body 1106 in various positions to adjust thumbstick tilt tension, according to an example embodiment. FIGS. 12-15 are described as follows.

In FIGS. 12-15, repositionable body 1106 includes a first cylindrical portion (threaded portion 1116), which is threaded according to a first handedness (e.g., left or right), and a second cylindrical portion (threaded portion 1112), which is threaded according to a second handedness that is opposite the first handedness, and having a diameter that is equal to or less than a diameter of the first cylindrical portion. Repositionable body 1106 also includes a midsection 1202 that connects the first and second cylindrical portions and has a diameter that is less than the diameters of the first and second cylindrical portions.

Threaded portion 1116 (the first cylindrical portion) is threaded compatibly with first threads of threaded portion 1118 in a surface of recess 1110. Threaded portion 1112 (the second cylindrical portion) is threaded compatibly with second threads of threaded portion 1114 in a surface of opening 1026 that couples recess 1110 to post opening 414 and recess 1022. (Note that second recess 1022 is shown as having a smaller diameter in a higher portion, and a larger diameter in a lower portion, although in other embodiments, recess 1022 may have a uniform diameter, such as shown for second recess 518 in FIGS. 5 and 6).

Figure 12:
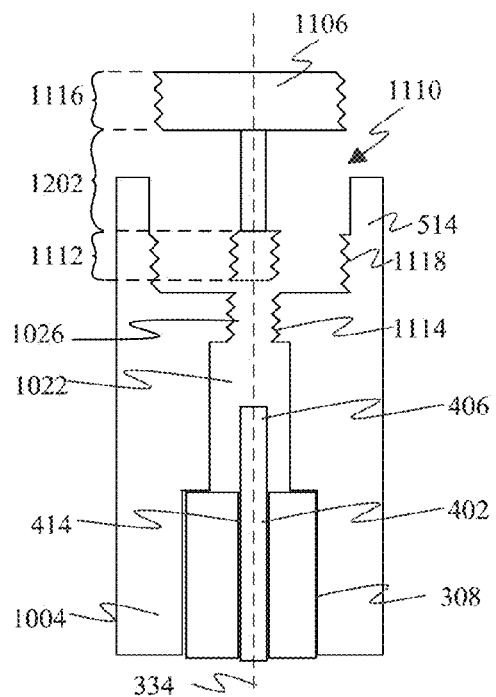
FIGS. 12-15 show cross-sectional perspective views of a thumbstick base mounted to a tilt-able post, the thumbstick base including a recess supporting a repositionable body, the repositionable body shown in various positions during installation and repositioning to adjust thumbstick tilt tension, according to an example embodiment.

With reference to FIG. 12, threaded portion 1112 of repositionable body 1106 extends into first recess 1110 in the end of protruding hollow cylindrical portion 514. Opening 1026 is accessible in recess 1110. Threads of threaded portions 1112 and 1116 of repositionable body 1106 are not engaged with threaded portions 1114 and 1118 of base 1004.

Figure 13:
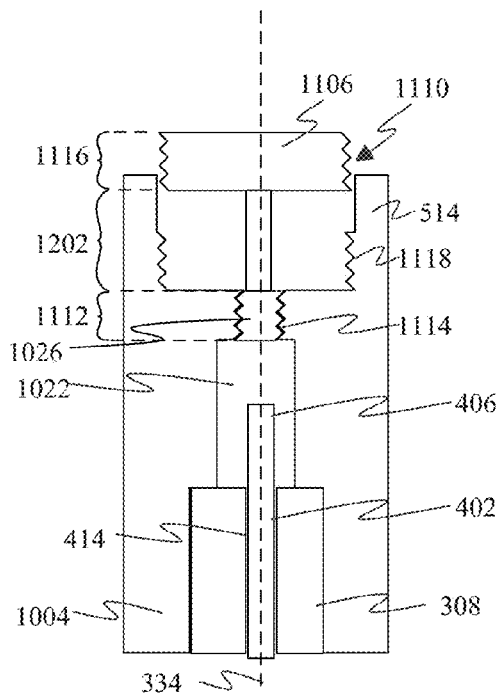

With reference to FIG. 13, threads of threaded portion 1112 are engaged with threads of threaded portion 1114 in opening 1026 by turning repositionable body 1106 in the first direction. Repositionable body 1106 may be turned in various ways, such as by a user using a tool (e.g., a wrench, a screwdriver) on a tool feature of repositionable body 1106, by fingers of the user, or in another manner.

Figure 14:
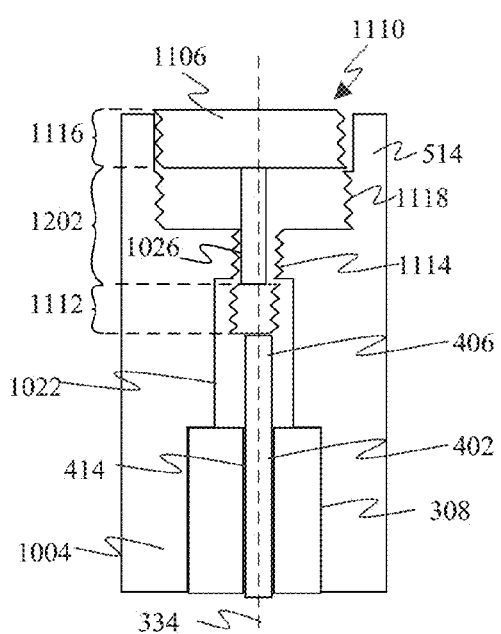

With reference to FIG. 14, threaded portion 1112 was turned completely past threaded portion 1114 in opening 1026, and midsection 1202 of repositionable body 1106 is positioned in opening 1026. No threads of repositionable body 1106 engage threads of base 1004, although repositionable body 1106 is restrained in base 1004, only being removable by threading threaded portion 1112 of repositionable body 1106 back though threaded portion 1114 by turning repositionable body 1106 in the second (opposite) direction. Furthermore, in FIG. 14, a bottom surface of threaded portion 1112 contacts first end 406 of pin 402, which extends from post opening 414 in post 308.

Figure 15:
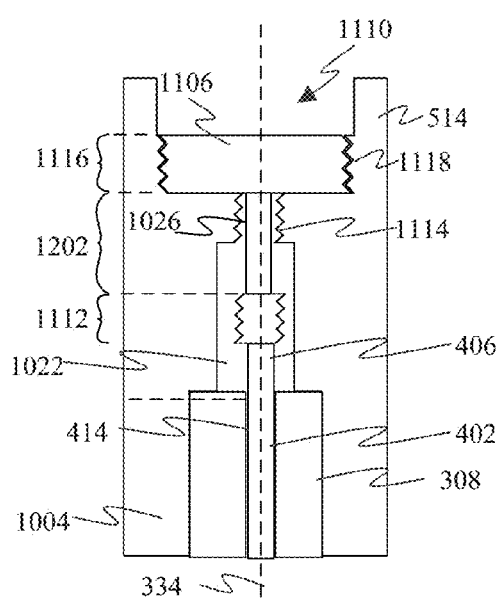

With reference to FIG. 15, threads of threaded portion 1116 of repositionable body 1106 are engaged with threaded portion 1118 in recess 1110 by turning repositionable body 1106 in the second direction, midsection 1202 extends through opening 1026, and the bottom surface of threaded portion 1112 contacts first end 406 of pin 402 extending from post opening 414 in post 308. Repositionable body 1106 is secure in recess 1110 by the engaged threads. By turning repositionable body 1106 in the second direction, repositionable body 1106 moves towards post 308 and pushes on pin 402 along post axis 334 in post opening 414, against the resistance by spring 336 (not shown in FIG. 15). Pin 402 is forced downward by a distance corresponding to a change of position of repositionable body 1106 along the length of recess 1110. In this manner, spring 336 is compressed, and the tilt tension of the thumbstick is increased. Repositionable body 1106 may be turned in the opposite direction (first direction) to retract repositionable body 1106, decreasing the force on end 406 of pin 402, lessening the compression of spring 336, and thereby decreasing the tilt tension of the thumbstick. However, turning repositionable body 1106 in the first direction does not accidentally fully retract and release repositionable body 1106 from base 1004, because threaded portion 1112 of repositionable body 1106 is threaded to move vertically downward into base 1004 when turned in the first direction, not upward.

While having opposite-handed threads makes repositionable body 1106 more difficult to remove, having like-handed threads still causes repositionable body 1106 to be difficult to remove because the user would need to pull up on repositionable body 1106, while rotating repositionable body 1106, in order to rethread threaded portions 1112 and 1114 and remove repositionable body 1106. Such a rethreading is difficult regardless of whether the same direction threads or different direction threads are used.

Repositionable bodies 1006 (FIG. 10) and 1106 (FIG. 11) may each be made of any suitable material, such as a metal (e.g., aluminum, steel) or metal alloy, a plastic, a resin, or other material.

C. Example Magnet Enhanced Recessed Post Embodiments for Enabling Tilt Tension Adjustment In embodiments, a portion of TAM 330 (FIG. 3) may be included in a thumbstick post. In one embodiment, the thumbstick post includes a recess in which a repositionable body resides. The body can be repositioned along the post axis by a user interacting with the thumbstick top to set compression of spring 336 to a corresponding amount, thereby dictating a particular amount of thumbstick tilt tension.

Accordingly, in embodiments similar to those described in the prior subsection, a portion of TAM 330 (FIG. 3) may be included in a thumbstick base (e.g., base 314 of FIG. 3). The thumbstick base includes a recess in which a repositionable body resides. In an embodiment, the body may be repositioned in the recess without use of a tool (e.g., by the user interacting with the thumbstick top) to set compression of spring 336 to a corresponding amount, thereby dictating a particular amount of thumbstick tilt tension. FIGS. 16-23 illustrate aspects of an example of such an embodiment. FIGS. 16-23 are described as follows.

Figure 16:
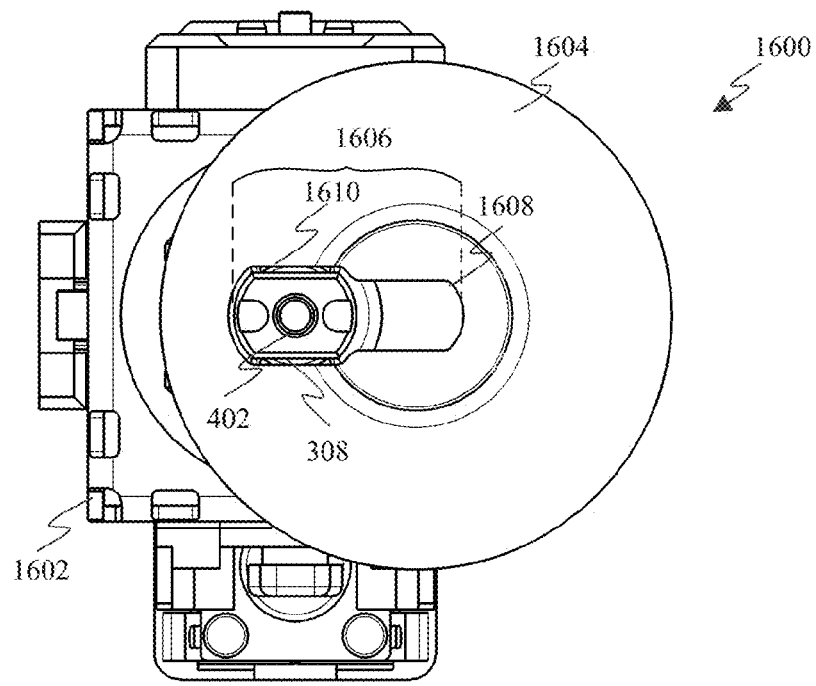
FIG. 16 shows a top view of a joystick assembly having a magnet mount in position to be attached thereto, according to an example embodiment.

FIG. 16 shows a top view of a thumbstick assembly 1600 that includes a joystick assembly 1602 and magnet mount 1604, according to an example embodiment. Joystick assembly 1602 is generally similar to joystick assembly 304 of FIG. 3, with differences described as follows. For instance, as shown in FIG. 16, magnet mount 1604 is coupled to joystick assembly 1602. Magnet mount 1604 may be made from a metal/metal alloy, a plastic, or other suitable material. In one embodiment, magnet mount 1604 mounts one or more discrete magnets (e.g., a ring of discrete magnets, one or more semi-circular magnets, a full circle-shaped magnet). In another embodiment, magnet mount 1604 may itself be made partially or fully of a magnetic material.

Figure 17:
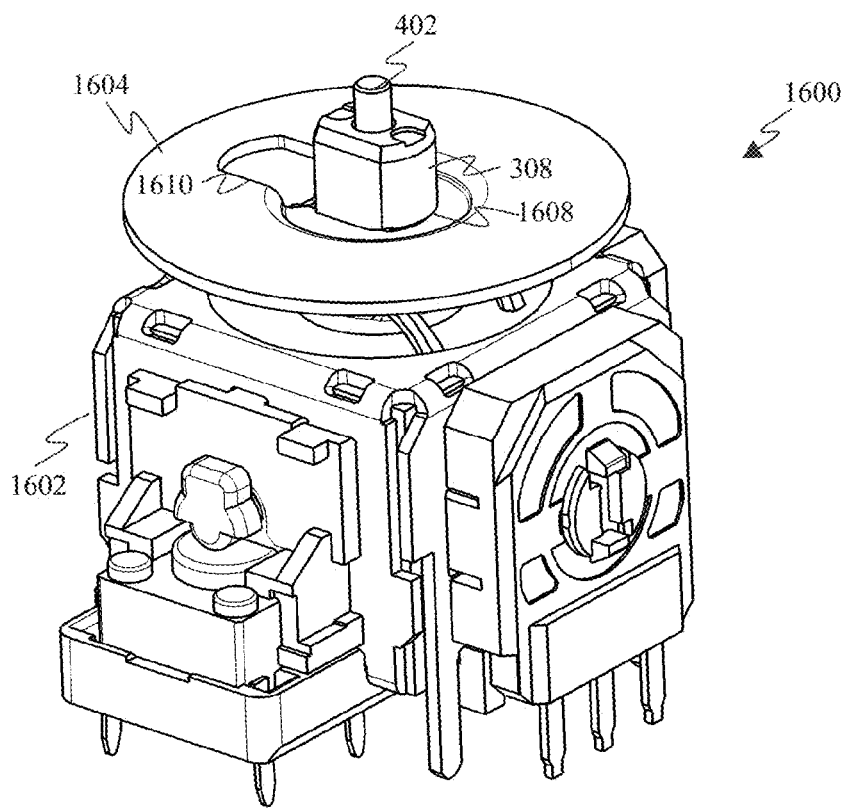
FIG. 17 shows a perspective view of the joystick assembly of FIG. 16 with the magnet mount attached thereto, according to an example embodiment.

In FIG. 16, magnet mount 1604 is shown in the process of being coupled to post 308 extending out of joystick assembly 1602. As shown in FIG. 16, magnet mount 1604 may have an opening 1606. Opening 1606 is configured to enable magnet mount 1604 to be attached to joystick assembly 1602, such as during a manufacturing/assembly stage for a thumbstick assembly. Opening 1606 has two open portions that connect together to form opening 1606, including a central elongated opening portion 1608 and a center-offset elongated opening portion 1610. Center-offset elongated opening portion 1610 is larger in size than central opening portion 1608, and is configured to receive post 308. Once post 308 is received in opening portion 1610, magnet mount 1604 may be shifted over (in the left direction of FIG. 16) so that post 308 is positioned in central opening portion 1608. FIG. 17 shows a perspective view of the joystick assembly of FIG. 16 with magnet mount 1604 attached thereto, with post 308 positioned in central opening portion 1608, according to an example embodiment. A width of opening portion 1608 may be configured to fit snug around a neck (narrowed portion) of post 308, to be mechanically attached thereto. In other embodiments, magnet mount 1604 may be attached to joystick assembly 1602 in other locations, and/or using other mechanisms.

Figure 18:
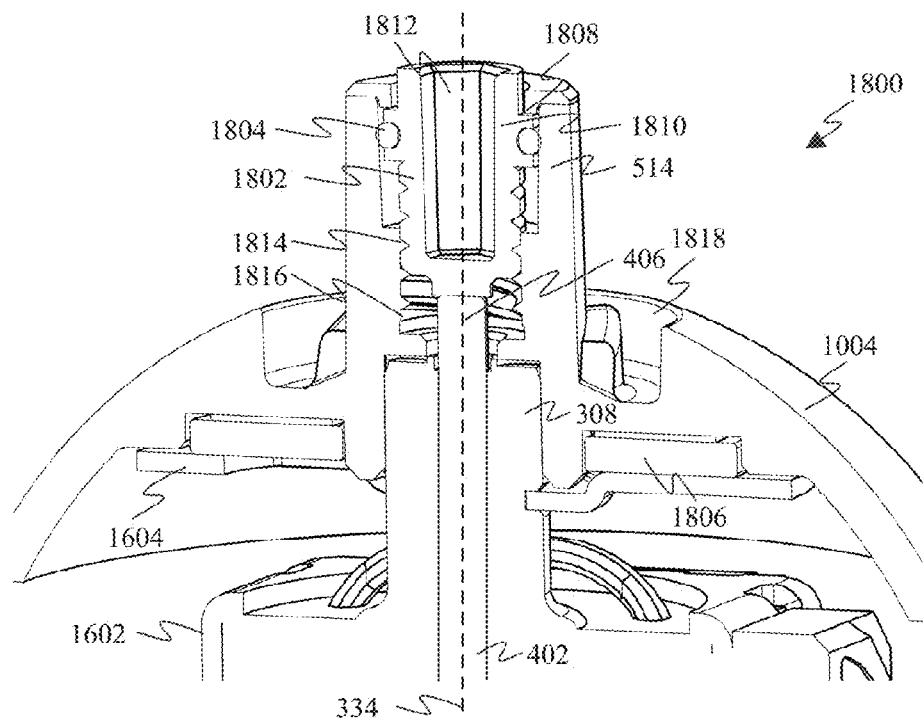
FIG. 18 shows a cross-sectional perspective view of a portion of a thumbstick base mounted on a joystick assembly that includes a magnet mount, the thumbstick base including a recess supporting a body that is repositionable to adjust thumbstick tilt tension, according to an example embodiment.

FIG. 18 shows a cross-sectional perspective view of a thumbstick assembly 1800, according to an example embodiment. Thumbstick assembly 1800 includes joystick assembly 1602 and magnet mount 1604 of FIG. 16, thumbstick base 1004, and a repositionable body 1802. As shown in FIG. 18, thumbstick base 1004 is mounted on joystick assembly 1602 over magnet mount 1604. Magnet mount 1604 mounts one or more magnets 1806 on a surface. Thumbstick base 1004 includes a recess 1808 (similar to recess 1010 of FIG. 1) that supports repositionable body 1802. Repositionable body 1802 is repositionable to adjust thumbstick tilt tension.

In particular, repositionable body 1802 is generally a cylinder having first and second cylindrical halves/portions 1810 and 1814. First cylindrical portion 1810 is ringed by a bearing 1804. Bearing 1804 is configured to secure repositionable body 1802 against the cylindrical inner surface of recess 1808. Bearing 1804 can have a ring shape or other shape, and be made of any suitable material, such as a rubber, a plastic, a resin, etc. Second cylindrical portion 1814 is threaded to mate with threads in a threaded portion 1816 of recess 1808. Repositionable body 1802 further includes a first end that includes a keyed opening 1812 and a second end in contact with first end 406 of pin 402. In an embodiment, a protrusion (e.g., a key) may be inserted into keyed opening 1812 to turn repositionable body 1802, thereby moving repositionable body 1802 upward or downward along axis 334, which compresses or decompresses spring 336 (not visible in FIG. 18), to correspondingly increase or decrease a tilt tension of thumbstick assembly 1800.

Figure 19:
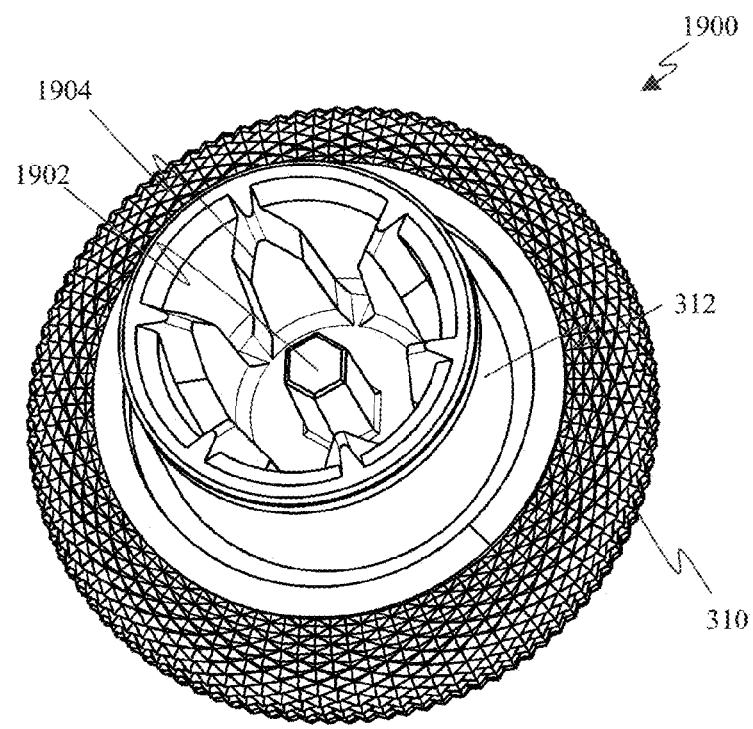
FIG. 19 shows a bottom perspective view of a thumbstick top configured to mount to the thumbstick base of FIG. 18, according to an example embodiment.

For instance, FIG. 19 shows a bottom perspective view of a thumbstick top 1900 configured to mount to thumbstick base 1004 of FIG. 18, according to an example embodiment. As shown in FIG. 19, thumbstick top 1900 is generally similar to thumbstick top 310 of FIG. 3, comprising a generally disk-shaped top 310 that is connected to an open cylindrical stem 312. An inner surface of the recess within cylindrical stem 312 mounts a central protrusion 1902. Protrusion 1902 is configured to interlock with keyed opening 1812 in the end of repositionable body 1802 (FIG. 18). The cylindrical inner wall/surface of cylindrical stem 312 is patterned with an interlock feature 1904. Interlock feature 1904 (e.g., one or more slots/grooves alternated with one more ridges) is configured to mate with a complementary interlock feature in a circular recess 1818 that encircles cylindrical portion 514 of thumbstick base 1004 in FIG. 18. The number of ridges in interlock feature 1904 does not have to match the number of grooves in recess 1818. The ridges in interlock feature 1904 have to follow a radial spacing pattern about axis 334 that matches the spacing in recess 1818. In the example embodiment of FIG. 19, thumbstick top 1900 has six ridges that mate with six grooves in thumbstick base 1004 (FIG. 18). However, in such an embodiment, thumbstick top 1900 may have other numbers of ridges, such as having a number of ridges in the range of one to six ridges.

Figure 20:
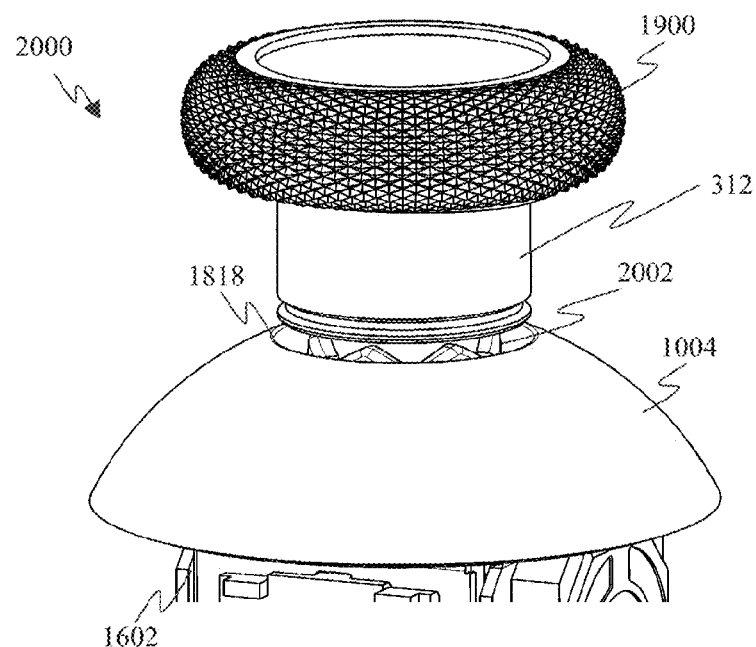
FIG. 20 shows a perspective view of the thumbstick top of FIG. 19 in position to be mounted to the thumbstick base and joystick assembly of FIG. 18, according to an example embodiment.

FIG. 20 shows a perspective view of a thumbstick assembly 2000 that includes thumbstick top 1900 of FIG. 19 mounting to thumbstick base 1004 of FIG. 18, according to an example embodiment. As shown in FIG. 20, thumbstick top 1900 is fitted over cylindrical portion 514 (shown in FIG. 18) of thumbstick base 1004 (which is mounted to joystick assembly 1602). Though not visible in FIG. 20, protrusion 1902 (FIG. 19) is inserted into keyed opening 1812 of repositionable body 1802 of FIG. 18. Furthermore, interlock feature 1904 on the inner walls of cylindrical stem 312 may be inserted into circular recess 1818 atop base 1004 to interlock with a complementary interlock feature 2002.

Figure 21:
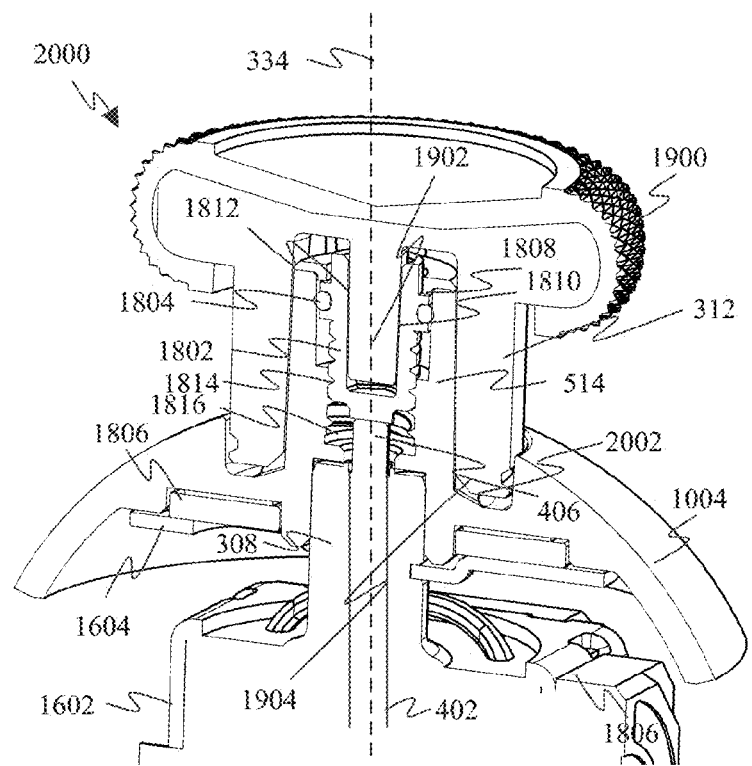
FIGS. 21-23 show cross-sectional perspective views of the thumbstick top of FIG. 19 in various positions with respect to the thumbstick base and joystick assembly of FIG. 18, the thumbstick top being rotated to reposition the repositionable body, thereby adjusting thumbstick tilt tension, according to example embodiments.
Figure 22:
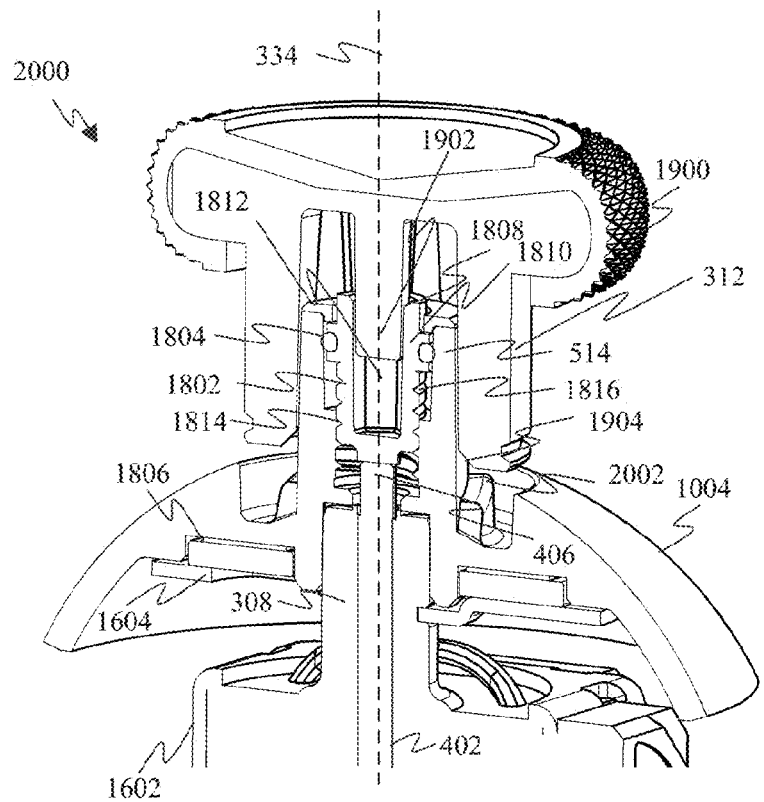
Figure 23:
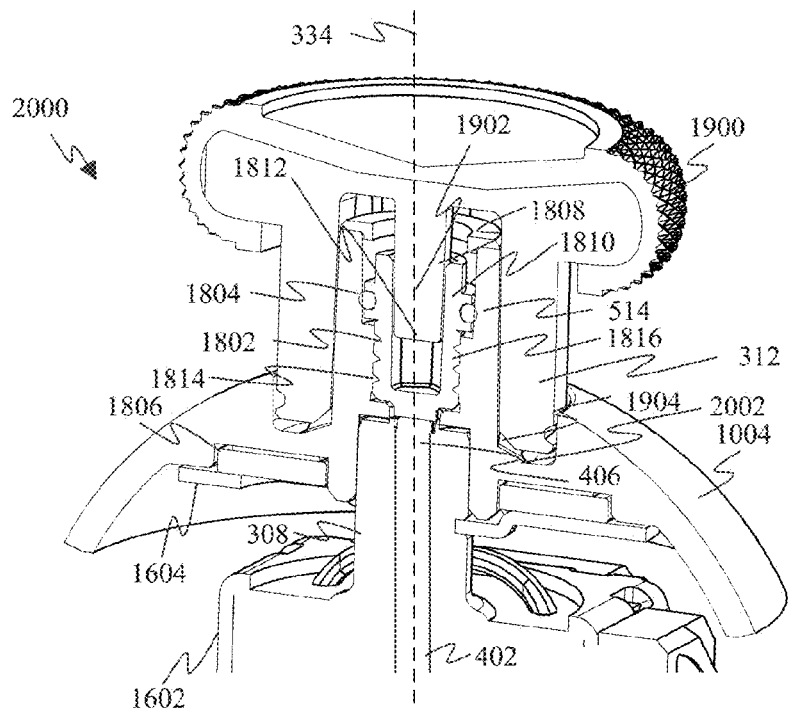

FIGS. 21-23 show cross-sectional perspective views of thumbstick assembly 2000 of FIG. 20 with thumbstick top 1900 being adjusted to reposition repositionable body 1802, thereby adjusting thumbstick tilt tension, according to example embodiments. As shown in FIG. 21, thumbstick top 1900 is engaged with cylindrical portion 514 of thumbstick base 1004. As such, interlock feature 1904 is mated with interlock feature 2002 to prevent thumbstick top 1900 from turning. Magnet 1806 attracts a material (e.g., a metal) of top 1900 to aid in keeping top 1900 engaged with base 1004. Furthermore, repositionable body 1802 is secure in recess 1808 and is in contact with first end 406 of pin 402, pushing pin 402 into post opening 414 against the resistance of spring 336 (not visible in FIG. 21), to cause a corresponding tilt tension in thumbstick assembly 2000.

In FIG. 22, a user adjusts the tilt tension of thumbstick assembly 2000. As shown in FIG. 22, thumbstick top 1900 is pulled away (e.g., by fingers of a user) from thumbstick base 1004 against the magnet attraction of magnet 1806. When pulled away, top 1900 can be turned to rotate repositionable body 1802 (because interlock features 1904 and 2002 are not interlocked), which repositions repositionable body 1802 along the length of recess 1808. This repositioning occurs because protrusion 1902 is still interlocked with repositionable body 1802, so that turning top 1900 turns repositionable body 1802 in recess 1808. Threads in threaded portion 1814 of repositionable body 1802, which are engaged by threads of threaded portion 1816 of recess 1808, cause repositionable body 1802 to move up or down along axis 334 depending on which way top 1900 is turned.

Note that the ridges in interlock feature 1904 (and/or interlock feature 2002) can be of any height/length. For instance, in one embodiment, the ridges can be relatively small such that tilt tension may be adjusted simply by rotating thumbstick top 1900 with respect to thumbstick base 1004, such that the ridges ride over the top of the grooves like a cam and follower configuration (in addition to using a "lift" of thumbstick top 1900 and rotation of thumbstick top 1900 with respect to thumbstick base 1004. In other embodiments, the ridges can be relatively large/high.

In FIG. 23, thumbstick top 1900 is re-engaged with cylindrical portion 514 of thumbstick base 1004. As such, interlock feature 1904 is re-mated with interlock feature 2002 to prevent thumbstick top 1900 from further turning. Magnet 1806 attracts the material of top 1900 to aid in keeping top 1900 re-engaged with base 1004. Repositionable body 1802 is again secure in recess 1808 and is in contact with first end 406 of pin 402. Due to the turning of top 1900 of FIG. 22, repositionable body 1802 is positioned deeper in recess 1808, pushing pin 402 further down into post opening 414, against an increased resistance and causing greater compression of spring 336 (not visible in FIG. 21), to cause a corresponding increase in tilt tension in thumbstick assembly 2000.

Repositionable body 1802 may be made of any suitable material, such as a metal (e.g., aluminum, steel) or metal alloy, a plastic, a resin, or other material. Magnet 1806 may be made of any suitable magnetic material, as would be known to persons skilled in the relevant art(s).

D. Example Embodiments for Enabling Tilt Tension Adjustment with Compression Disk In further embodiments, TAM 330 (FIG. 3) may include a compression disk in a chamber inside the thumbstick post. The compression disk has a central hole through which the pin passes. The pin may be rotated to increase or decrease compression of spring 336 between the compression disk and thumbstick base to a corresponding amount, thereby dictating a particular amount of thumbstick tilt tension.

Figure 24:
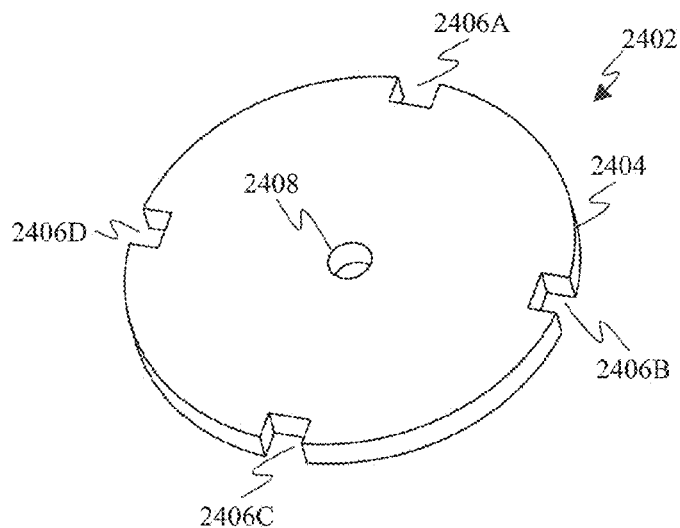
FIG. 24 shows a perspective view of a compression disk, according to an example embodiment.

For instance, FIG. 24 shows a perspective view of a compression disk 2402, according to an example embodiment. In the example of FIG. 24, compression disk 2402 is circular in shape, flat, and relatively thin (compared to its width). As shown in FIG. 24, compression disk 2402 has a threaded central opening 2408 (in which the threaded section of pin 402 can engage and reside), and one or more mating features 2406A-2406D in a perimeter edge 2404 of compression disk 2402. Any number of mating features may be present. Mating features 2406A-2406D are configured to interlock with complementary mating features in an inner surface of a chamber in a thumbstick post. This mating holds compression disk 2402 from rotating when pin 402 is rotated.

Figure 25:
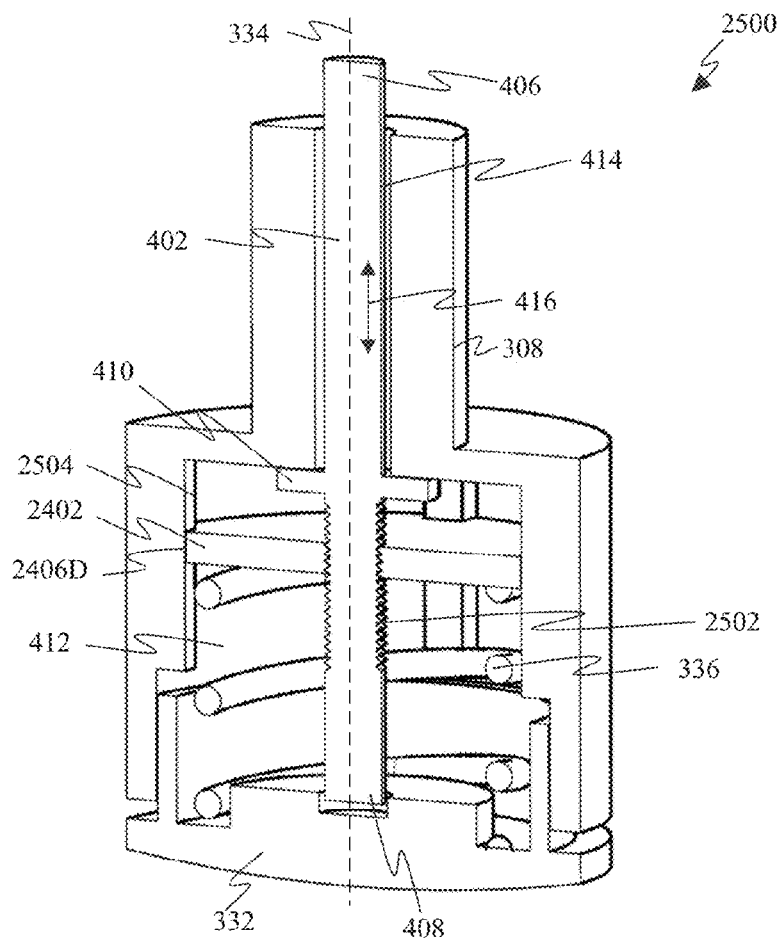
FIG. 25 shows a cross-sectional perspective view of a joystick assembly that contains a pin, a spring, and the compression disk of FIG. 24, which are configured to enable thumbstick tilt tension adjustment, according to an example embodiment.

FIG. 25 shows a cross-sectional perspective view of a portion of a joystick assembly 2500, according to an example embodiment. As shown in FIG. 25, joystick assembly 2500 includes tilt-able post 308. Post 308 includes base portion 332 having a bottom that is a pivot surface for the tilting of tilt-able post 308. Pin 402 resides in post opening 414 that extends through post 308 along axis 334 of post 308. Pin 402 has opposing first and second ends 406 and 408, and has flange 410 extending around at least a portion of a circumference of pin 308 between first and second ends 406 and 408. Pin 402 has a threaded section/portion 2502 between flange 410 and second end 408. Chamber 412 is a cylindrical open space within a lower section of joystick assembly 2500 through which pin 402 extends and spring 336 resides. Spring 336 coils around the circumference of pin 402 in chamber 412. Compression disk 2402 is positioned in chamber 412. Pin 402 passes through opening 2408 in compression disk 2402, such that threaded portion 2502 of pin 402 resides in (is engaged in) threaded opening 2408. Spring 336 is compressed between a lower surface of compression disk 2402 and a surface of base portion 332 (e.g., a top ledge of base portion 332).

Compression disk 2402 is movable along post axis 334 (which passes through opening 2408) in chamber 412 from a first position (e.g., an upper most position, where compression disk 2402 is in contact with flange 410, or other position along pin 402) to any position along pin 402 closer to base portion 332. Compression disk 2402 moves up or down on pin 402 due to the rotation of pin 402 by a user. For example, the user may remove a thumbstick top from a thumbstick assembly, and may rotate pin 402 using fingers, a tool (e.g., pliers, a screwdriver inserted in a slot in first end 406 of pin 402, a wrench), or other mechanism. Alternatively, first end 406 of pin 402 may be connected to the thumbstick top, and pin 402 may be rotated by the user turning the thumbstick top. Rotation of pin 402 causes compression disk 2402, which is held from itself rotating by mating features 2406A-2406D in perimeter edge 2404 of compression disk 2402 mating with corresponding mating features 2504 (e.g., ridges) that extend vertically along the inner surface of chamber 412, to move up or down along axis 334. Compression disk 2402 moves against resistance by spring 336, either compressing or decompressing spring 336, to modify the tilt tension of pin 402 by an amount dictated by the resulting amount of compression of spring 336.

Compression disk 2402 may be made of any suitable material, such as a metal (e.g., aluminum, steel) or metal alloy, a plastic, a resin, or other material.

E. Example Embodiments for Enabling Tilt Tension Adjustment with Thumbstick Top Patterned Edge In embodiments, a portion of TAM 330 (FIG. 3) may be included in a thumbstick top, and in particular in a patterned edge of the stem portion of the top. The patterned edge is configured to mate with corresponding patterned edge on the thumbstick base. In an embodiment, the thumbstick top may be raised and rotated relative to the thumbstick base, and released back into engagement with the base, to set compression of spring 336 to a corresponding amount, thereby dictating a particular amount of thumbstick tilt tension.

Figure 26:
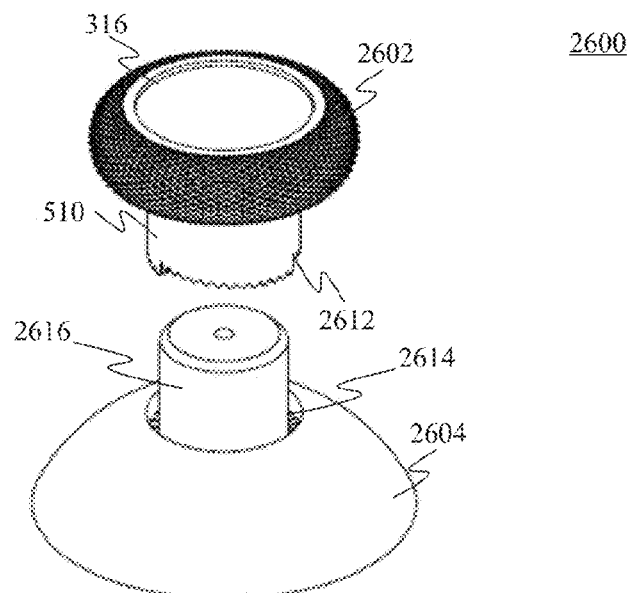
FIG. 26 shows an exploded perspective view of a thumbstick assembly having a thumbstick top that mounts to a thumbstick base via a stem edge formed with a plurality of ramps patterned with mating features, according to an example embodiment.

For instance, FIG. 26 shows an exploded perspective view of a thumbstick assembly 2600, according to an example embodiment. As shown in FIG. 26, thumbstick assembly 2600 includes a thumbstick top 2602, a thumbstick base 2604, an interface member 2606, and a joystick assembly 2608. Thumbstick assembly 2600 is further described as follows.

Joystick assembly 2608 is generally similar to thumbstick switch assemblies 304 (FIG. 3), 400 (FIG. 4), and 1602 (FIG. 16). As shown in FIG. 26, joystick assembly 2608 mounts a magnet 2610. Magnet 2610 may include a magnet mount with a magnet mounted thereto, similar to magnet mount 1604 and magnet 1806 (e.g., FIG. 18), or may combine a mount and magnet in a single structure. Magnet 2610 may be a continuous circle as shown in FIG. 26, may be a ring of discrete magnets, or may have another form.

Interface member 2606 is a cylindrical shaped body that functions as an extension of the tilt-able post (e.g., post 308; not shown in FIG. 26) of joystick assembly 2608. As shown in FIG. 26, thumbstick base 2604 is configured to connect to/mount to interface member 2606. Interface member 2606 mounts to joystick assembly 2608. For example, interface member 2606 may mount to a central location on a surface of magnet 2610 (e.g., attached by an adhesive), or may be attached to joystick assembly 2608 in another manner (e.g., through an opening in the center of magnet 2610). In another embodiment, interface member 2606 may be a part of joystick assembly 2608 (e.g., similarly to post 308 of joystick assembly 400 in FIG. 4), and may extend through an opening in magnet 2610.

Base 2604 includes a cylindrical portion 2616 (similar to cylindrical portion 514 of FIG. 5), which is externally accessible through an aperture (e.g., aperture 324 in FIG. 3) in a housing of a user input device. Cylindrical portion 2616 extends from a center of a dome-shaped portion of thumbstick base 2604. A ring shaped recess 2614 encircles cylindrical portion 2616, formed in the surface of thumbstick base 2604. Base 2604 (e.g., a recess in the bottom of base 2604) is configured to mount to interface member 2606.

Thumbstick top 2602 is configured to be removably connected to cylindrical portion 2616 of thumbstick base 2604. Thumbstick top 2602 is manipulable by a user to cause a displacement of the tilt-able post (e.g., post 308 in joystick assembly 2608, and interface member 2606, when present) from the default, center upright position. Thumbstick top 2602 includes a cylindrical stem 510 with an open end having a patterned circular edge 2612. As further described below, edge 2612 is sectioned into a plurality of ramps, and each ramp is patterned with mating features.

As described above, ring shaped recess 2614 encircles cylindrical portion 2616 on body 2604. Ring shaped recess 2614 includes a plurality of ramps, and each ramp is patterned with mating features. Patterned circular edge 2612 of thumbstick top 2602 is configured to mate with the ramps/mating features in ring shaped recess 2614. Thumbstick top 2602 can be rotated by a user to mate patterned circular edge 2612 with ring shaped recess 2614 at different relative positions. The different relative rotation positions change a distance of thumbstick 2602 above base 2604. Pin 402 (not visible in FIG. 26) is inserted through post opening 414 (such as in FIG. 4; not visible in FIG. 26), a central opening in magnet 2610, a central opening through interface member 2606, and a central opening in base 2604 (all aligned on a same axis), to contact a bottom surface of top 2602. As such by changing a height of thumbstick 2602 above base 2604, spring 336 coiled around pin 402 may be compressed by a greater or lesser amount between thumbstick top 2602 and a base of joystick assembly 2608, causing a corresponding change in the tilt tension of thumbstick assembly 2600.

Figure 27:
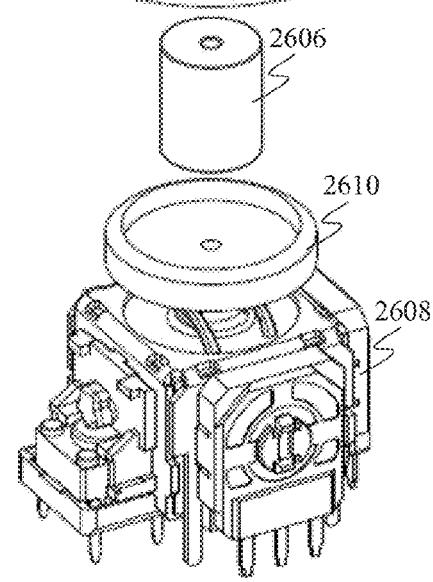
FIG. 27 shows an inverted perspective view of the thumbstick top of FIG. 26, illustrating the stem edge formed with the plurality of ramps patterned with mating features, according to an example embodiment.
Figure 27:
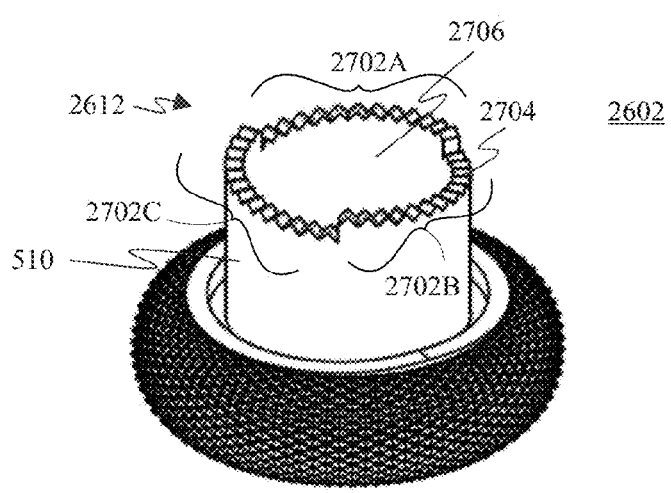

FIG. 27 shows an inverted perspective view of thumbstick top 2602 of FIG. 26, according to an example embodiment. As shown in FIG. 27, patterned circular edge 2612 has a plurality of ramps 2702A-2702C formed thereon, each ramp covering one third (120 degrees) of the circumference of patterned circular edge 2612. Each of ramps 2702A-2702C is patterned with mating features 2704 (e.g., rows of teeth, notches, bumps). Although three ramps are shown in FIG. 27, any number of two or more ramps may be present, each including a set of mating features 2704. Ring shaped recess 2614 in base 2604 has the same number of ramps, and a corresponding pattern of mating features 2704 as patterned circular edge 2612, so that edge 2612 and recess 2614 are capable of mating.

In another embodiment, one or more additional concentric patterned circular edges may be present that encircle patterned circular edge 2612. In such an embodiment, each patterned circular edge each has a same number of one or more ramps, that each include mating features 2704. In such an embodiment, ring shaped recess 2614 in base 2604 has a same number of ring shaped recesses as top 2602 has concentric patterned circular edges, which have the same number of ramps and mating features as their corresponding pattern circular edge, so that the edges and recesses are capable of mating.

In either embodiment, thumbstick top 2602 is configured to be pullable away from thumbstick base 2604 against attraction by magnet 2610, to be rotated to reposition the ramps 2702A-2702C of patterned circular edge 2612 of top 2602 relative to the ramps and mating features in ring shaped recess 2614 of base 2604, and to be released back to base 2604 to re-mate patterned circular edge 2612 with ring shaped recess 2614 in a modified position, to modify the tilt tension of the tilt-able post. When multiple concentric patterned circular edges are present in thumbstick top 2602, and corresponding features are present in ring shaped recess 2614 in base 2604, thumbstick top 2602 may be similarly pulled away, rotated, and re-mated with base 2604 to modify the tilt tension of the tilt-able post.

Figure 28:
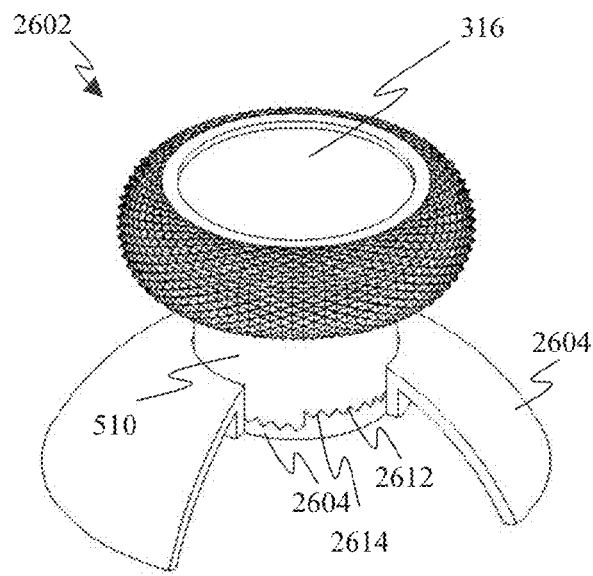
FIG. 28 shows a perspective view of the thumbstick top of FIG. 27 mounted to the thumbstick base of FIG. 26 in a non-rotated, flush position to enable a first amount of thumbstick tilt tension, according to an example embodiment.

For instance, FIG. 28 shows a perspective view of thumbstick top 2602 mounted to thumbstick base 2604 of FIG. 26 in a flush position (aligned at zero degrees; not rotated relative to each other) to enable a first amount of thumbstick tilt tension, according to an example embodiment. In FIG. 28, each ramp of edge 2612 of top 2602 is aligned fully with a corresponding ramp of recess 2614. As such, top 2602 is in a least raised position relative to base 2604, and thus pin 402 (not visible in FIG. 28; refer to FIG. 4 for example) is positioned in post opening 414 at a closest position to the base of the joystick assembly, compressing spring 336 a relatively greater amount, to cause a relatively greater amount of tilt tension in the thumbstick assembly.

Figure 29:
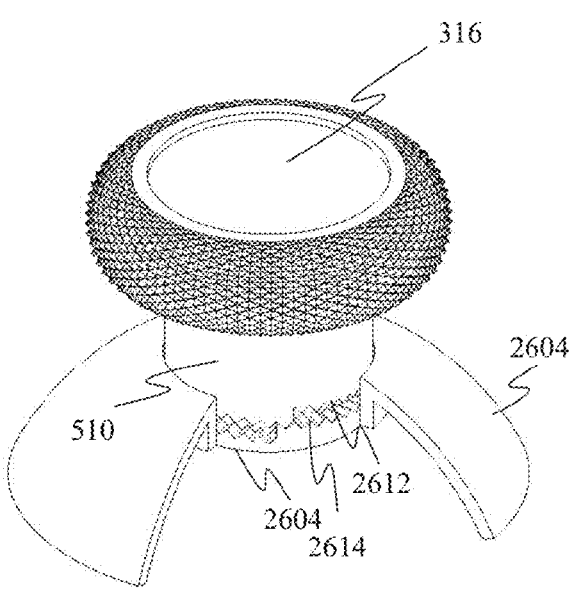
FIG. 29 shows a perspective view of the thumbstick top of FIG. 27 mounted to the thumbstick base of FIG. 26 in a rotated/offset, spaced position to enable a second amount of thumbstick tilt tension, according to an example embodiment.

In contrast, FIG. 29 shows a perspective view of thumbstick top 2602 mounted to the thumbstick base 2605 in a rotated (offset by roughly 10 degrees in this example), spaced position to enable a second amount of thumbstick tilt tension, according to an example embodiment. In FIG. 29, each ramp of edge 2612 of top 2602 is aligned in an offset position with a corresponding ramp of recess 2614. As such, top 2602 is separated from base 2604 by a greater amount than shown in FIG. 28. Thus, pin 402 (not visible in FIG. 29; refer to FIG. 4 for example) is positioned in post opening 414 at a further position away from the base of the joystick assembly relative to FIG. 28, compressing spring 336 relatively less, to cause a relatively lesser amount of tilt tension in the thumbstick assembly.

Accordingly, thumbstick top 2602 may be rotated by any number of degrees between perfect alignment between edge 2612 of top 2602 and recess 2614 of base 2604, and a maximal offset/non-alignment between edge 2612 of top 2602 and recess 2614 of base 2604 (determined by the circumferential degrees used by each ramp), to vary the tilt tension from a maximum possible amount to a minimum possible amount.

IV. Example Embodiments

In one embodiment, a user input device comprises: a housing that defines an internal cavity of the user input device and includes an aperture; a joystick assembly that is disposed within the internal cavity, the joystick assembly comprising a tilt-able post and being operable to generate an analog input control signal based on a position of the tilt-able post in relation to a default position; a thumbstick cap that is mounted through the aperture to an end of the tilt-able post; and an adjustment mechanism configured to enable a tilt tension of the tilt-able post to be changed.

In an embodiment, the adjustment mechanism comprises: a pin that resides in a post opening that extends through the tilt-able post along an axis of the tilt-able post, the pin having opposing first and second ends, and having a flange positioned between the first and second ends that extends around at least a portion of a circumference of the pin; and a spring that coils around the circumference of the pin and is compressed between the flange and a base portion of the tilt-able post; the pin being movable along the post axis through the post opening from a first position to at least one additional position along the post axis to change the compression of the spring and thereby modify the tilt tension of the tilt-able post.

In an embodiment, the thumbstick cap comprises: a thumbstick base that is connected to the tilt-able post of the joystick assembly and that includes a portion that is externally accessible with respect to the housing through the aperture; and a thumbstick top that is removably connected to the externally-accessible portion of the thumbstick base, the thumbstick top being manipulable by a user to cause a displacement of the tilt-able post from the default position, the thumbstick top including a protrusion that contacts the first end of the pin and repositions the pin along the post axis in the post opening, against the resistance by the spring, by a distance corresponding to a length of the protrusion.

In an embodiment, the thumbstick cap comprises: a thumbstick base that is connected to the tilt-able post of the joystick assembly and that includes a portion that is externally accessible with respect to the housing through the aperture; and a thumbstick top that is removably connected to the externally-accessible portion of the thumbstick base, the thumbstick top being manipulable by a user to cause a displacement of the tilt-able post from the default position, the thumbstick top including a recess; wherein the adjustment mechanism further comprises: a repositionable body at least partially inserted in the recess, the repositionable body secure in the recess and in contact with the first end of the pin, the repositionable body repositionable along at least a portion of the length of the recess to cause the pin to be repositioned along the post axis in the post opening, the reposition of the pin causing a change in the compression of the spring.

In an embodiment, the thumbstick cap comprises: a thumbstick base that is connected to the tilt-able post of the joystick assembly and that includes a cylindrical portion that is externally accessible with respect to the housing through the aperture; a thumbstick top that is removably connected to the externally-accessible cylindrical portion of the thumbstick base, the thumbstick top being manipulable by a user to cause a displacement of the tilt-able post from the default position; and wherein the adjustment mechanism further comprises: a repositionable body at least partially inserted in a first recess in the cylindrical portion of the thumbstick base, the thumbstick base having a second recess opposite the first recess that receives the post, the post opening accessible from the first recess via a second opening that connects the first and second recesses, the repositionable body secure in the first recess and extending through the second opening to contact the first end of the pin in the second recess, the repositionable body repositionable along at least a portion of a length of the first recess to cause the pin to be repositioned along the post axis in the post opening, the reposition of the pin causing a change in the compression of the spring.

In an embodiment, the repositionable body comprises: a first cylindrical portion threaded according to a first handedness; a second cylindrical portion threaded according to a second handedness that is opposite the first handedness, and having a diameter that is equal to or less than a diameter of the first cylindrical portion; and a midsection that connects the first and second cylindrical portions and has a diameter that is less than the diameters of the first and second cylindrical portions.

In an embodiment, the first cylindrical portion is threaded compatibly with first threads in a surface of the first recess; the second cylindrical portion is threaded compatibly with second threads in a surface of the second opening; and the first cylindrical portion is positioned in the first recess, the midsection extends through the second opening, and the second cylindrical portion is positioned in the second recess in contact with the first end of the pin.

In an embodiment, the repositionable body comprises: a first cylindrical portion ringed by a bearing configured to secure the repositionable body against a surface of the first recess; a second cylindrical portion that is threaded compatibly with threads in the surface of the first recess; a keyed opening in a first end of the repositionable body; and a second end in contact with the first end of the pin.

In an embodiment, the thumbstick cap comprises: a thumbstick base that is connected to the tilt-able post of the joystick assembly and that includes a portion that is externally accessible with respect to the housing through the aperture; and a thumbstick top that is removably connected to the externally-accessible portion of the thumbstick base, the thumbstick top being manipulable by a user to cause a displacement of the tilt-able post from the default position, the thumbstick top including a protrusion configured to interlock with the keyed opening in the first end of the repositionable body; the adjustment mechanism further comprising: a magnet configured to attract the thumbstick top to the thumbstick base; the thumbstick top configured to be pulled away from the thumbstick base against the magnet attraction, to be turned to rotate the repositionable body, which repositions the repositionable body along the length of the recess, and to be released back into connection with the thumbstick base by the magnet attraction.

In an embodiment, the adjustment mechanism comprises: a pin that resides in a post opening that extends through the tilt-able post along an axis of the tilt-able post, the pin having opposing first and second ends, a threaded section, and having a flange between the first and second ends that extends around at least a portion of a circumference of the pin and resides in a chamber in the tilt-able post to which the post opening opens; a compression disk having a threaded central opening in which the threaded section of the pin resides, and a least one mating feature in a perimeter edge configured to interlock with a mating feature in an inner surface of the chamber to hold the compression disk from rotating; and a spring that resides in the chamber, coils around the circumference of the pin, and is compressed between the compression disk and a base portion of the tilt-able post; the compression disk being movable along the post axis in the chamber from a first position to at least one additional position closer to the base portion of the tilt-able post, to change a compression of the spring and thereby modify the tilt tension of the tilt-able post.

In an embodiment, the thumbstick cap comprises: a thumbstick base that is connected to the tilt-able post of the joystick assembly and that includes a cylindrical portion that is externally accessible with respect to the housing through the aperture; and a thumbstick top that is removably connected to the cylindrical portion of the thumbstick base, the thumbstick top being manipulable by a user to cause a displacement of the tilt-able post from the default position, the thumbstick top including a cylindrical stem with an open end having a patterned circular edge that is sectioned into a plurality of ramps, each ramp patterned with mating features; the adjustment mechanism including: a magnet mounted underneath the thumbstick base; and a ring shaped recess in the thumbstick bases around the cylindrical portion, the ring shaped recess including a plurality of ramps, each ramp patterned with mating features, the patterned circular edge of the thumbstick top configured to mate with the ring shaped recess; the thumbstick top configured to be pulled away from the thumbstick base against attraction by the magnet, to be rotated to reposition the patterned circular edge relative to the ring shaped recess, and to be released back to the thumbstick base to re-mate the patterned circular edge with the ring shaped recess in a modified position thereby modifying the tilt tension of the tilt-able post.

In another embodiment, a thumbstick for a user input device comprises: a joystick assembly comprising a tilt-able post and being operable to generate an analog input control signal based on a position of the tilt-able post in relation to a default position; a thumbstick cap that is connected to the joystick assembly; and an adjustment mechanism configured to enable a tilt tension of the tilt-able post to be changed.

In an embodiment, the adjustment mechanism comprises: a pin that resides in a post opening that extends through the tilt-able post along an axis of the tilt-able post, the pin having opposing first and second ends, and having a flange positioned between the first and second ends that extends around at least a portion of a circumference of the pin; and a spring that coils around the circumference of the pin and is compressed between the flange and a base portion of the tilt-able post; the pin being movable along the post axis through the post opening from a first position to at least one additional position along the post axis to change the compression of the spring and thereby modify the tilt tension of the tilt-able post.

In an embodiment, the thumbstick cap comprises: a thumbstick base that is connected to the tilt-able post of the joystick assembly; and a thumbstick top that is removably connected to the thumbstick base, the thumbstick top being manipulable by a user to cause a displacement of the tilt-able post from the default position, the thumbstick top including a protrusion that contacts the first end of the pin and repositions the pin along the post axis in the post opening, against the resistance by the spring, by a distance corresponding to a length of the protrusion.

In an embodiment, the thumbstick cap comprises: a thumbstick base that is connected to the tilt-able post of the joystick assembly; and a thumbstick top that is removably connected to the thumbstick base, the thumbstick top being manipulable by a user to cause a displacement of the tilt-able post from the default position, the thumbstick top including a recess; wherein the adjustment mechanism further comprises: a repositionable body at least partially inserted in the recess, the repositionable body secure in the recess and in contact with the first end of the pin, the repositionable body repositionable along at least a portion of the length of the recess to cause the pin to be repositioned along the post axis in the post opening, the reposition of the pin causing a change in the compression of the spring.

In an embodiment, the thumbstick cap comprises: a thumbstick base that is connected to the tilt-able post of the joystick assembly and that includes a cylindrical portion; and a thumbstick top that is removably connected to the cylindrical portion of the thumbstick base, the thumbstick top being manipulable by a user to cause a displacement of the tilt-able post from the default position; wherein the adjustment mechanism further comprises: a repositionable body at least partially inserted in a first recess in the cylindrical portion of the thumbstick base, the thumbstick base having a second recess opposite the first recess that receives the post, the post opening accessible from the first recess via a second opening that connects the first and second recesses, the repositionable body secure in the first recess and extending through the second opening to contact the first end of the pin in the second recess, the repositionable body repositionable along at least a portion of a length of the first recess to cause the pin to be repositioned along the post axis in the post opening, the reposition of the pin causing a change in the compression of the spring.

In an embodiment, the repositionable body comprises: a first cylindrical portion threaded according to a first handedness; a second cylindrical portion threaded according to a second handedness that is opposite the first handedness, and having a diameter that is equal to or less than a diameter of the first cylindrical portion; and a midsection that connects the first and second cylindrical portions and has a diameter that is less than the diameters of the first and second cylindrical portions; the first cylindrical portion is threaded compatibly with first threads in a surface of the first recess; the second cylindrical portion is threaded compatibly with second threads in a surface of the second opening; and the first cylindrical portion is positioned in the first recess, the midsection extends through the second opening, and the second cylindrical portion is positioned in the second recess in contact with the first end of the pin.

In an embodiment, the repositionable body comprises: a first cylindrical portion ringed by a bearing configured to secure the repositionable body against a surface of the first recess; a second cylindrical portion that is threaded compatibly with threads in the surface of the first recess; a keyed opening in a first end of the repositionable body; and a second end in contact with the first end of the pin; the thumbstick top includes: a protrusion configured to interlock with the keyed opening in the first end of the repositionable body; the adjustment mechanism further comprising: a magnet configured to attract the thumbstick top to the thumbstick base; the thumbstick top configured to be pulled away from the thumbstick base against the magnet attraction, to be turned to rotate the repositionable body, which repositions the repositionable body along the length of the recess, and to be released back into connection with the thumbstick base by the magnet attraction.

In an embodiment, the adjustment mechanism comprises: a pin that resides in a post opening that extends through the tilt-able post along an axis of the tilt-able post, the pin having opposing first and second ends, a threaded section, and having a flange between the first and second ends that extends around at least a portion of a circumference of the pin and resides in a chamber in the tilt-able post to which the post opening opens; a compression disk having a threaded central opening in which the threaded section of the pin resides, and a least one mating feature in a perimeter edge configured to interlock with a mating feature in an inner surface of the chamber to hold the compression disk from rotating; a spring that resides in the chamber, coils around the circumference of the pin, and is compressed between the compression disk and a base portion of the tilt-able post; the compression disk being movable along the post axis in the chamber from a first position to at least one additional position closer to the base portion of the tilt-able post, to change a compression of the spring and thereby modify the tilt tension of the tilt-able post.

In an embodiment, the thumbstick cap comprises: a thumbstick base that is connected to the tilt-able post of the joystick assembly and that includes a cylindrical portion; and a thumbstick top that is removably connected to the cylindrical portion of the thumbstick base, the thumbstick top being manipulable by a user to cause a displacement of the tilt-able post from the default position, the thumbstick top including a cylindrical stem with an open end having a patterned circular edge that is sectioned into a plurality of ramps, each ramp patterned with mating features; the adjustment mechanism including: a magnet mounted underneath the thumbstick base; and a ring shaped recess in the thumbstick bases around the cylindrical portion, the ring shaped recess including a plurality of ramps, each ramp patterned with mating features, the patterned circular edge of the thumbstick top configured to mate with the ring shaped recess; the thumbstick top configured to be pulled away from the thumbstick base against attraction by the magnet, to be rotated to reposition the patterned circular edge relative to the ring shaped recess, and to be released back to the thumbstick base to re-mate the patterned circular edge with the ring shaped recess in a modified position, thereby modifying the tilt tension of the tilt-able post.

In another embodiment, a method for a thumbstick of a user input device comprises: positioning a pin in a first position in an opening that extends axially through a tilt-able post of the thumbstick, the positioning of the pin in the first position compressing a spring that coils around the circumference of the pin by a first amount to provide the tilt-able post with a first tilt tension; and re-positioning the pin, based on user interaction, in a second position in the opening that is different from the first position to compress the spring by a second amount to provide the tilt-able post with a second tilt tension.

V. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A user input device, comprising:
   a housing that defines an internal cavity of the user input device and includes an aperture;
   a joystick assembly that is disposed within the internal cavity, the joystick assembly comprising a tilt-able post and being operable to generate an analog input control signal based on a position of the tilt-able post in relation to a default position;
   a thumbstick cap that is mounted through the aperture to an end of the tilt-able post; and
   an adjustment mechanism configured to enable a tilt tension of the tilt-able post to be changed.

2. The user input device of claim 1, wherein the adjustment mechanism comprises:
   a pin that resides in a post opening that extends through the tilt-able post along an axis of the tilt-able post, the pin having opposing first and second ends, a threaded section, and having a flange between the first and second ends that extends around at least a portion of a circumference of the pin and resides in a chamber in the tilt-able post to which the post opening opens;
   a compression disk having a threaded central opening in which the threaded section of the pin resides, and a least one mating feature in a perimeter edge configured to interlock with a mating feature in an inner surface of the chamber to hold the compression disk from rotating; and
   a spring that resides in the chamber, coils around the circumference of the pin, and is compressed between the compression disk and a base portion of the tilt-able post;
   the compression disk being movable along the post axis in the chamber from a first position to at least one additional position closer to the base portion of the tilt-able post, to change a compression of the spring and thereby modify the tilt tension of the tilt-able post.

3. The user input device of claim 1, wherein the adjustment mechanism comprises:
   a pin that resides in a post opening that extends through the tilt-able post along an axis of the tilt-able post, the pin having opposing first and second ends, and having a flange positioned between the first and second ends that extends around at least a portion of a circumference of the pin; and
   a spring that coils around the circumference of the pin and is compressed between the flange and a base portion of the tilt-able post;
   the pin being movable along the post axis through the post opening from a first position to at least one additional position along the post axis to change the compression of the spring, and thereby modify the tilt tension of the tilt-able post.

4. The user input device of claim 3, wherein the thumb stick cap comprises:
   a thumbstick base that is connected to the tilt-able post of the joystick assembly and that includes a cylindrical portion that is externally accessible with respect to the housing through the aperture; and
   a thumbstick top that is removably connected to the cylindrical portion of the thumb stick base, the thumbstick top being manipulable by a user to cause a displacement of the tilt-able post from the default position, the thumbstick top including a cylindrical stem with an open end having a patterned circular edge that is sectioned into a plurality of ramps, each ramp patterned with mating features;
   the adjustment mechanism including:
      a magnet mounted underneath the thumbstick base; and
      a ring shaped recess in the thumbstick bases around the cylindrical portion, the ring shaped recess including a plurality of ramps, each ramp patterned with mating features, the patterned circular edge of the thumbstick top configured to mate with the ring shaped recess;
      the thumbstick top configured to be pulled away from the thumbstick base against attraction by the magnet, to be rotated to reposition the patterned circular edge relative to the ring shaped recess, and to be released back to the thumbstick base to re-mate the patterned circular edge with the ring shaped recess in a modified position, to modify the tilt tension of the tilt-able post.

5. The user input device of claim 3, wherein the thumb stick cap comprises:
   a thumbstick base that is connected to the tilt-able post of the joystick assembly and that includes a portion that is externally accessible with respect to the housing through the aperture; and
   a thumbstick top that is removably connected to the externally-accessible portion of the thumbstick base, the thumbstick top being manipulable by a user to cause a displacement of the tilt-able post from the default position, the thumbstick top including
      a protrusion that contacts the first end of the pin and repositions the pin along the post axis in the post opening, against the resistance by the spring, by a distance corresponding to a length of the protrusion.

6. The user input device of claim 3, wherein the thumbstick cap comprises:
   a thumbstick base that is connected to the tilt-able post of the joystick assembly and that includes a portion that is externally accessible with respect to the housing through the aperture; and
   a thumbstick top that is removably connected to the externally-accessible portion of the thumbstick base, the thumbstick top being manipulable by a user to cause a displacement of the tilt-able post from the default position, the thumbstick top including a recess;
   wherein the adjustment mechanism further comprises:
      a repositionable body at least partially inserted in the recess, the repositionable body secure in the recess and in contact with the first end of the pin, the repositionable body repositionable along at least a portion of the length of the recess to cause the pin to be repositioned along the post axis in the post opening, the reposition of the pin causing a change in the compression of the spring.

7. The user input device of claim 3, wherein the thumb stick cap comprises:
   a thumbstick base that is connected to the tilt-able post of the joystick assembly and that includes a cylindrical portion that is externally accessible with respect to the housing through the aperture; and
   a thumbstick top that is removably connected to the externally-accessible cylindrical portion of the thumbstick base, the thumbstick top being manipulable by a user to cause a displacement of the tilt-able post from the default position;
   wherein the adjustment mechanism further comprises:
      a repositionable body at least partially inserted in a first recess in the cylindrical portion of the thumbstick base, the thumbstick base having a second recess opposite the first recess that receives the post, the post opening accessible from the first recess via a second opening that connects the first and second recesses, the repositionable body secure in the first recess and extending through the second opening to contact the first end of the pin in the second recess, the repositionable body repositionable along at least a portion of a length of the first recess to cause the pin to be repositioned along the post axis in the post opening, the reposition of the pin causing a change in the compression of the spring.

8. The user input device of claim 7, wherein the repositionable body comprises:
 a first cylindrical portion threaded according to a first handedness;
 a second cylindrical portion threaded according to a second handedness that is opposite the first handedness, and having a diameter that is equal to or less than a diameter of the first cylindrical portion; and
 a midsection that connects the first and second cylindrical portions and has a diameter that is less than the diameters of the first and second cylindrical portions.

9. The user input device of claim 8, wherein the first cylindrical portion is threaded compatibly with first threads in a surface of the first recess;
 the second cylindrical portion is threaded compatibly with second threads in a surface of the second opening; and
 the first cylindrical portion is positioned in the first recess, the midsection extends through the second opening, and the second cylindrical portion is positioned in the second recess in contact with the first end of the pin.

10. The user input device of claim 7, wherein the repositionable body comprises:
 a first cylindrical portion ringed by a bearing configured to secure the repositionable body against a surface of the first recess;
 a second cylindrical portion that is threaded compatibly with threads in the surface of the first recess;
 a keyed opening in a first end of the repositionable body; and
 a second end in contact with the first end of the pin.

11. The user input device of claim 10, wherein the thumbstick top further includes
 a protrusion configured to interlock with the keyed opening in the first end of the repositionable body;
the adjustment mechanism further comprising:
 a magnet configured to attract the thumbstick top to the thumb stick base;
 the thumbstick top configured to be pulled away from the thumbstick base against the magnet attraction, to be turned to rotate the repositionable body, which repositions the repositionable body along the length of the recess, and to be released back into connection with the thumbstick base by the magnet attraction.

12. A thumbstick for a user input device, comprising:
 a joystick assembly comprising a tilt-able post and being operable to generate an analog input control signal based on a position of the tilt-able post in relation to a default position;
 a thumbstick cap that is connected to the joystick assembly; and
 an adjustment mechanism configured to enable a tilt tension of the tilt-able post to be changed.

13. The thumbstick of claim 12, wherein the adjustment mechanism comprises:
 a pin that resides in a post opening that extends through the tilt-able post along an axis of the tilt-able post, the pin having opposing first and second ends, a threaded section, and having a flange between the first and second ends that extends around at least a portion of a circumference of the pin and resides in a chamber in the tilt-able post to which the post opening opens;
 a compression disk having a threaded central opening in which the threaded section of the pin resides, and a least one mating feature in a perimeter edge configured to interlock with a mating feature in an inner surface of the chamber to hold the compression disk from rotating;
 a spring that resides in the chamber, coils around the circumference of the pin, and is compressed between the compression disk and a base portion of the tilt-able post;
 the compression disk being movable along the post axis in the chamber from a first position to at least one additional position closer to the base portion of the tilt-able post, to change a compression of the spring and thereby modify the tilt tension of the tilt-able post.

14. The thumbstick of claim 12, wherein the adjustment mechanism comprises:
 a pin that resides in a post opening that extends through the tilt-able post along an axis of the tilt-able post, the pin having opposing first and second ends, and having a flange positioned between the first and second ends that extends around at least a portion of a circumference of the pin; and
 a spring that coils around the circumference of the pin and is compressed between the flange and a base portion of the tilt-able post;
 the pin being movable along the post axis through the post opening from a first position to at least one additional position along the post axis to change the compression of the spring and thereby modify the tilt tension of the tilt-able post.

15. The thumbstick of claim 14, wherein the thumbstick cap comprises:
 a thumbstick base that is connected to the tilt-able post of the joystick assembly; and
 a thumbstick top that is removably connected to the thumbstick base, the thumbstick top being manipulable by a user to cause a displacement of the tilt-able post from the default position, the thumbstick top including a protrusion that contacts the first end of the pin and repositions the pin along the post axis in the post opening, against the resistance by the spring, by a distance corresponding to a length of the protrusion.

16. The thumbstick of claim 14, wherein the thumbstick cap comprises:
 a thumbstick base that is connected to the tilt-able post of the joystick assembly; and
 a thumbstick top that is removably connected to the thumbstick base, the thumbstick top being manipulable by a user to cause a displacement of the tilt-able post from the default position, the thumbstick top including a recess;
wherein the adjustment mechanism further comprises:
 a repositionable body at least partially inserted in the recess, the repositionable body secure in the recess and in contact with the first end of the pin, the repositionable body repositionable along at least a portion of the length of the recess to cause the pin to be repositioned along the post axis in the post opening, the reposition of the pin causing a change in the compression of the spring.

17. The thumbstick of claim 14, wherein the thumbstick cap comprises:
 a thumbstick base that is connected to the tilt-able post of the joystick assembly and that includes a cylindrical portion; and
 a thumbstick top that is removably connected to the cylindrical portion of the thumb stick base, the thumbstick top being manipulable by a user to cause a displacement of the tilt-able post from the default position;
wherein the adjustment mechanism further comprises:
 a repositionable body at least partially inserted in a first recess in the cylindrical portion of the thumbstick base, the thumbstick base having a second recess opposite the first recess that receives the post, the post opening accessible from the first recess via a second opening that connects the first and second recesses, the repositionable body secure in the first recess and extending through the second opening to contact the first end of the pin in the second recess, the repositionable body repositionable along at least a portion of a length of the first recess to cause the pin to be repositioned along the post axis in the post opening, the reposition of the pin causing a change in the compression of the spring.

18. The thumbstick of claim 17, wherein the repositionable body comprises:
 a first cylindrical portion threaded according to a first handedness;
 a second cylindrical portion threaded according to a second handedness that is opposite the first handedness, and having a diameter that is equal to or less than a diameter of the first cylindrical portion; and
 a midsection that connects the first and second cylindrical portions and has a diameter that is less than the diameters of the first and second cylindrical portions;
 the first cylindrical portion is threaded compatibly with first threads in a surface of the first recess;
 the second cylindrical portion is threaded compatibly with second threads in a surface of the second opening; and
 the first cylindrical portion is positioned in the first recess, the midsection extends through the second opening, and the second cylindrical portion is positioned in the second recess in contact with the first end of the pin.

19. The thumbstick of claim 17, wherein the repositionable body comprises:
 a first cylindrical portion ringed by a bearing configured to secure the repositionable body against a surface of the first recess;
 a second cylindrical portion that is threaded compatibly with threads in the surface of the first recess;
 a keyed opening in a first end of the repositionable body; and
 a second end in contact with the first end of the pin;

the thumbstick top includes:
 a protrusion configured to interlock with the keyed opening in the first end of the repositionable body;
the adjustment mechanism further comprising:
 a magnet configured to attract the thumbstick top to the thumb stick base;
 the thumbstick top configured to be pulled away from the thumbstick base against the magnet attraction, to be turned to rotate the repositionable body, which repositions the repositionable body along the length of the recess, and to be released back into connection with the thumbstick base by the magnet attraction.

20. The thumbstick of claim 14, wherein the thumbstick cap comprises:
 a thumbstick base that is connected to the tilt-able post of the joystick assembly and that includes a cylindrical portion; and
 a thumbstick top that is removably connected to the cylindrical portion of the thumb stick base, the thumbstick top being manipulable by a user to cause a displacement of the tilt-able post from the default position, the thumbstick top including a cylindrical stem with an open end having a patterned circular edge that is sectioned into a plurality of ramps, each ramp patterned with mating features;
the adjustment mechanism including:
 a magnet mounted underneath the thumbstick base; and
 a ring shaped recess in the thumbstick bases around the cylindrical portion, the ring shaped recess including a plurality of ramps, each ramp patterned with mating features, the patterned circular edge of the thumbstick top configured to mate with the ring shaped recess;
 the thumbstick top configured to be pulled away from the thumbstick base against attraction by the magnet, to be rotated to reposition the patterned circular edge relative to the ring shaped recess, and to be released back to the thumbstick base to re-mate the patterned circular edge with the ring shaped recess in a modified position, thereby modifying the tilt tension of the tilt-able post.

21. A method for a thumbstick of a user input device, comprising:
 positioning a pin in a first position in an opening that extends axially through a tilt-able post of the thumb stick, the positioning of the pin in the first position compressing a spring that coils around the circumference of the pin by a first amount to provide the tilt-able post with a first tilt tension; and
 re-positioning the pin, based on user interaction, in a second position in the opening that is different from the first position to compress the spring by a second amount to provide the tilt-able post with a second tilt tension.

\* \* \* \* \*